US012233905B2

(12) United States Patent
Armstrong-Crews et al.

(10) Patent No.: US 12,233,905 B2
(45) Date of Patent: Feb. 25, 2025

(54) CLASSIFICATION OF OBJECTS BASED ON MOTION PATTERNS FOR AUTONOMOUS VEHICLE APPLICATIONS

(71) Applicant: Waymo LLC, Mountain View, CA (US)

(72) Inventors: Nicholas Armstrong-Crews, Mountain View, CA (US); Mingcheng Chen, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 518 days.

(21) Appl. No.: 17/087,470

(22) Filed: Nov. 2, 2020

(65) Prior Publication Data
US 2022/0135074 A1    May 5, 2022

(51) Int. Cl.
*B60W 60/00*    (2020.01)
*G01S 17/58*    (2006.01)
(Continued)

(52) U.S. Cl.
CPC .... *B60W 60/0015* (2020.02); *B60W 60/0011* (2020.02); *G01S 17/58* (2013.01);
(Continued)

(58) Field of Classification Search
CPC ......... B60W 60/0015; B60W 60/0011; B60W 2420/52; B60W 2554/20;
(Continued)

(56) References Cited

U.S. PATENT DOCUMENTS 8,112,223 B2    2/2012   Jordan et al.
9,851,470 B2   12/2017   Henderson
(Continued)

FOREIGN PATENT DOCUMENTS

CN    111612818 A   *  9/2020
EP      3252501 A1    12/2017
(Continued)

OTHER PUBLICATIONS

An Introduction to LIDAR: The Key Self-Driving Car Sensor (Year: 2017).*
(Continued)

*Primary Examiner* — Thomas Ingram
*Assistant Examiner* — Faris Asim Shaikh
(74) *Attorney, Agent, or Firm* — LOWENSTEIN SANDLER LLP

(57) ABSTRACT

Aspects and implementations of the present disclosure address shortcomings of the existing technology by enabling motion pattern-assisted object classification of objects in an environment of an autonomous vehicle (AV) by obtaining, from a sensing system of the AV, a plurality of return points, each return point comprising one or more velocity values and one or more coordinates of a reflecting region that reflects a signal emitted by the sensing system, identifying an association of the plurality of return points with an object in an environment of the AV, identifying, in view of the one or more velocity values of at least some of the plurality of return points, a type of the object or a type of a motion of the object, and causing a driving path of the AV to be determined in view of the identified type of the object.

19 Claims, 11 Drawing Sheets

(51) Int. Cl.
*G06V 20/58* (2022.01)
*G06V 40/10* (2022.01)

(52) U.S. Cl.
CPC .......... *G06V 20/584* (2022.01); *G06V 40/103* (2022.01); *B60W 2420/408* (2024.01); *B60W 2554/20* (2020.02); *B60W 2554/4029* (2020.02)

(58) Field of Classification Search
CPC ............ B60W 2554/4029; G01S 17/58; G01S 17/931; G01S 7/4804; G01S 7/4808; G06V 20/584; G06V 40/103; G06V 40/10; G06V 20/58; G06V 2201/08; G06V 10/764; G06V 20/56; G06V 40/20; G06V 10/811; G06V 20/10; G06V 10/26; G06V 10/255; G06V 10/25; G06V 20/54; H04L 41/0893; H04L 45/46; H04L 67/2866; G06T 2207/10028; G06T 2207/30261; G06T 2207/30252; G06T 7/521; G06T 7/73; G06T 7/20; G06T 2207/30241; G06T 17/00; G06K 9/6217; G06K 9/6218; G06K 9/6222; G06K 9/6223; G06K 9/6224; G06K 9/6269; G06K 9/6272
See application file for complete search history.

(56) References Cited

U.S. PATENT DOCUMENTS

| | | | |
|---|---|---|---|
| 10,262,234 B2 | 4/2019 | Li et al. | |
| 10,620,631 B1 | 4/2020 | Abeloe | |
| 10,884,422 B2 | 1/2021 | Zhang et al. | |
| 10,891,744 B1* | 1/2021 | Wyffels | G06V 10/7715 |
| 10,991,105 B2* | 4/2021 | Fukamachi | G06T 5/50 |
| 11,029,395 B1 | 6/2021 | Barber | |
| 11,113,873 B1* | 9/2021 | Bosse | G06T 19/20 |
| 11,328,210 B2 | 5/2022 | Mondello et al. | |
| 11,448,735 B2* | 9/2022 | O'Keeffe | G01S 7/4816 |
| 2005/0099637 A1* | 5/2005 | Kacyra | G01B 11/002 |
| | | | 356/601 |
| 2005/0285774 A1 | 12/2005 | Wittenberg et al. | |
| 2007/0219720 A1 | 9/2007 | Trepagnier et al. | |
| 2012/0064949 A1 | 3/2012 | Kavounas | |
| 2014/0028842 A1* | 1/2014 | Abramson | G06V 20/52 |
| | | | 348/143 |
| 2014/0049765 A1* | 2/2014 | Zheleznyak | G01S 17/89 |
| | | | 356/4.02 |
| 2014/0307247 A1 | 10/2014 | Zhu et al. | |
| 2014/0347207 A1 | 11/2014 | Zeng et al. | |
| 2015/0107358 A1* | 4/2015 | Parke | G01C 25/005 |
| | | | 73/514.02 |
| 2015/0198711 A1 | 7/2015 | Zeng et al. | |
| 2018/0129216 A1* | 5/2018 | Pasteau | B60L 3/0015 |
| 2018/0136321 A1 | 5/2018 | Verghese | |
| 2018/0299556 A1* | 10/2018 | Marcus | G01S 17/894 |
| 2018/0335787 A1 | 11/2018 | Zeng et al. | |
| 2018/0348343 A1 | 12/2018 | Achour et al. | |
| 2019/0011541 A1 | 1/2019 | O'Keeffe | |
| 2019/0079193 A1 | 3/2019 | Gunnam | |
| 2019/0120955 A1 | 4/2019 | Zhong et al. | |
| 2019/0138822 A1 | 5/2019 | Yao et al. | |
| 2019/0302767 A1 | 10/2019 | Sapp et al. | |
| 2019/0317219 A1* | 10/2019 | Smith | G01S 17/931 |
| 2019/0318206 A1 | 10/2019 | Smith | |
| 2020/0041619 A1* | 2/2020 | Maheshwari | G06T 7/0002 |
| 2020/0182992 A1 | 6/2020 | Kellner et al. | |
| 2020/0201351 A1 | 6/2020 | Armstrong-Crews et al. | |
| 2020/0271785 A1* | 8/2020 | Sebastian | H04N 13/211 |
| 2020/0301013 A1* | 9/2020 | Banerjee | G01S 13/867 |
| 2020/0302237 A1* | 9/2020 | Hennings Yeomans | G06V 20/56 |
| 2020/0309957 A1 | 10/2020 | Bhaskaran et al. | |
| 2020/0371228 A1 | 11/2020 | Wang | |
| 2020/0398894 A1* | 12/2020 | Hudecek | G05D 1/0214 |
| 2020/0400821 A1* | 12/2020 | Baker | G01S 17/58 |
| 2021/0001868 A1 | 1/2021 | Ahn et al. | |
| 2021/0024069 A1 | 1/2021 | Herman | |
| 2021/0049779 A1* | 2/2021 | Harviainen | G06T 7/33 |
| 2021/0056713 A1 | 2/2021 | Rangesh et al. | |
| 2021/0097723 A1* | 4/2021 | Kim | H04N 19/137 |
| 2021/0141092 A1 | 5/2021 | Chen | |
| 2021/0173055 A1 | 6/2021 | Jian | |
| 2021/0229657 A1 | 7/2021 | Herman | |
| 2021/0255307 A1* | 8/2021 | Bongio Karrman | G01S 13/726 |
| 2021/0256321 A1* | 8/2021 | Gerardo Castro | G06F 18/23 |
| 2021/0261152 A1* | 8/2021 | Meijburg | G01C 21/3691 |
| 2021/0261159 A1* | 8/2021 | Pazhayampallil | B60W 10/18 |
| 2021/0339738 A1 | 11/2021 | Lashkari | |
| 2021/0390331 A1* | 12/2021 | Kellner | G01S 15/66 |
| 2021/0396887 A1 | 12/2021 | Schmalenberg | |
| 2022/0058402 A1* | 2/2022 | Hunt | H04N 23/661 |
| 2022/0119002 A1* | 4/2022 | Ladd | G06N 3/08 |
| 2022/0122363 A1* | 4/2022 | Liong | G06V 10/809 |
| 2022/0128995 A1 | 4/2022 | Chen et al. | |
| 2022/0146676 A1 | 5/2022 | Armstrong-Crews et al. | |
| 2022/0229164 A1 | 7/2022 | Steinberg | |
| 2022/0262100 A1* | 8/2022 | Chandler | G06N 5/00 |
| 2022/0276375 A1* | 9/2022 | Armstrong-Crews | G01S 7/411 |
| 2022/0327719 A1 | 10/2022 | Shaag et al. | |
| 2023/0076905 A1* | 3/2023 | Wyffels | G06F 18/2431 |

FOREIGN PATENT DOCUMENTS

| | | | |
|---|---|---|---|
| EP | 3285230 | A1 | 2/2018 |
| EP | 3367121 | A1 | 8/2018 |
| EP | 3525000 | A1 | 8/2019 |
| EP | 3367121 | B1 | 4/2020 |
| EP | 3745158 | A1 | 12/2020 |
| JP | 2012518793 | A | 8/2012 |
| JP | 2015035019 | A | 2/2015 |
| KR | 20200011813 | A | 2/2020 |
| WO | 2014168851 | A1 | 10/2014 |
| WO | 2018127789 | A1 | 7/2018 |
| WO | 2019154536 | A1 | 8/2019 |
| WO | 2020210276 | A1 | 10/2020 |
| WO | 2022087308 | A1 | 4/2022 |
| WO | 2022094429 | A1 | 5/2022 |

OTHER PUBLICATIONS

Translation of CN-111612818-A retrieved from Espacenet on Jun. 26, 2023 (Year: 2023).*
Aeye idar "iDAR is Smarther than LiDAR", aeye.ai/idar/, retrieved Oct. 20, 2020, 11 pages.
Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
International Search Report and Written Opinion dated Feb. 18, 2022, on application No. PCT/US2021/057622, 12 pages.
International Search Report and Written Opinion dated Feb. 15, 2022, on application No. PCT/US2021/056105, 10 pages.
International Search Report and Written Opinion dated Feb. 23, 2022, on application No. PCT/US2021/057623, 10 pages.
Extended European Search Report for European Application No. 22175897.2, mailed Nov. 2, 2022, 10 Pages.
International Preliminary Report on Patentability for International Application No. PCT/US2021/056105, mailed May 4, 2023, 7 Pages.
International Preliminary Report on Patentability for International Application No. PCT/US2021/057622, mailed May 11, 2023, 7 Pages.
International Preliminary Report on Patentability for International Application No. PCT/US2021/057623, mailed May 11, 2023, 7 Pages.

(56) References Cited

OTHER PUBLICATIONS

Extended European Search Report for European Application No. 21883928.0, mailed Aug. 13, 2024, 11 Pages.
Hu Y., et al., "Robust 6-DOF Motion Sensing for an Arbitrary Rigid Body by Multi-view Laser Doppler Measurements," Optics Express, Nov. 27, 2017, vol. 25(24), pp. 30371-30387.

* cited by examiner

CLASSIFICATION OF OBJECTS BASED ON MOTION PATTERNS FOR AUTONOMOUS VEHICLE APPLICATIONS

TECHNICAL FIELD

The instant specification generally relates to autonomous vehicles. More specifically, the instant specification relates to improving autonomous driving systems and components using velocity sensing data to assist in classification of objects in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1A:
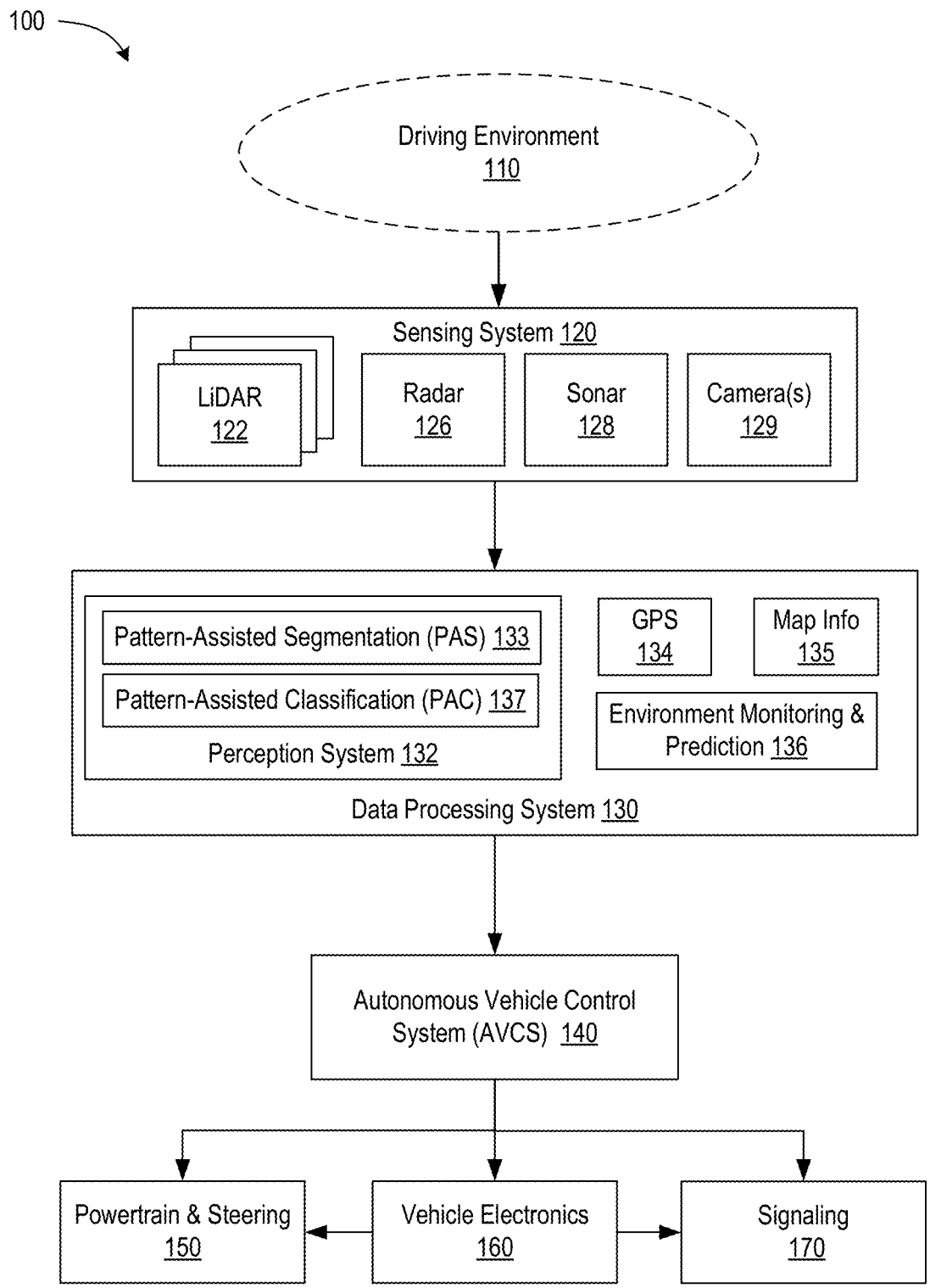
FIG. 1A is a diagram illustrating components of an example autonomous vehicle capable of using motion patterns for object classification and tracking, in accordance with some implementations of the present disclosure.

In one implementation, disclosed is a method of obtaining, by a sensing system of an autonomous vehicle (AV), a plurality of return points, each return point comprising one or more velocity values and one or more coordinates of a reflecting region that reflects a signal emitted by the sensing system, identifying an association of the plurality of return points with an object in an environment of the AV, identifying, in view of the one or more velocity values of at least some of the plurality of return points, a type of the object or a type of a motion of the object, and causing a driving path of the AV to be determined in view of the identified type of the object.

In another implementation, disclosed is a system that includes a sensing system of an autonomous vehicle (AV), the sensing system to obtain a plurality of return points, each return point comprising one or more velocity values and one or more coordinates of a reflecting region that reflects a signal emitted by the sensing system. The disclosed system further includes a perception system of the AV to identify an association of the plurality of return points with an object in an environment of the AV, identify, in view of the one or more velocity values of at least some of the plurality of return points, a type of the object or a type of a motion of the object, and cause a driving path of the AV to be determined in view of the identified type of the object.

In another implementation, disclosed is a non-transitory computer-readable medium having instructions stored thereon that, when executed by a computing device, cause the computing device to obtain, from a sensing system of an autonomous vehicle (AV), a plurality of return points, each return point comprising one or more velocity values and one or more coordinates of a reflecting region that reflects a signal emitted by the sensing system, identify an association of the plurality of return points with an object in an environment of the AV, identify, in view of the one or more velocity values of at least some of the plurality of return points, a type of the object, and cause a driving path of the AV to be determined in view of the identified type of the object.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover an entire 360-degree view by scanning to collect in a series of consecutive frames identified with timestamps. As a result, each sector in space is sensed in time increments $\Delta\tau$, which are determined by the frequency of scanning (e.g., velocity of the rotation of the lidar transmitter). "Frame" or "sensing frame," as used herein, can refer to the entire 360-degree view of the environment obtained over scanning cycle or, alternatively, to any smaller sector, e.g., a 1-degree, 5-degree, a 10-degree, or any other angle obtained over a fraction of the transmitter cycle (revolution).

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame. A single object, such as another vehicle, a road sign, a pedestrian, and so on, can generate multiple return points. For example, a 10-degree frame can include returns from one or more road signs, multiple vehicles located at various distances from the lidar device (mounted on the autonomous vehicle) and moving with different speeds in different directions, a pedestrian crossing a roadway, walking along a sidewalk, or standing by the roadside, and many other objects. Segmenting (performed by a perception system of the autonomous vehicle) a given point cloud into clusters that correspond to different objects can be useful in autonomous driving applications. Points that are close (e.g., are separated by a small angular distance and correspond to reflections from similar distances) can nonetheless belong to different objects. For example, a traffic sign and a pedestrian standing or walking close to the sign can generate close return points. Similarly, a car and a bicycle moving in adjacent lanes can generate close return points. Accordingly, geometric methods of identification that are agnostic about velocities of various objects (or parts of the objects) can fail (or take a considerable time) to distinguish distinct but closely separate objects.

ToF lidars are typically used for ranging. ToFs can also be capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that between consecutive signals (frames) the object does not change its position appreciably in relation to other objects of the environment, but still long enough to allow the lidar to accurately detect the changes in the object's position. However, ToF lidar devices are generally incapable of determining velocities of objects based on a single sensing frame.

Aspects and implementations of the present disclosure address these and other shortcomings of the existing technologies by enabling methods of Doppler-assisted object classification, using velocity sensing data, for various moving objects present in environments of the autonomous vehicles. Specifically, coherent lidars take advantage of a phase information encoded into transmitted signals and carried by the emitted electromagnetic waves to the target and back and provide additional functionality unavailable in the standard ToF lidar technology. A coherent lidar detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent lidar allows, in addition to obtaining the range information, to associate a radial velocity with the return points of the point cloud (radial velocimetry). This additional information, as described in more detail below, enables efficient classification of objects that display distinct motion patterns of various parts of the objects. For example, a pattern of correlated motion of arms and legs during walking or running can be used to identify an object as a pedestrian. A pattern of a combination of a translational and a rotational motion can be used to identify an object as a rolling wheel (e.g., attached to a vehicle). A pattern of a rotational motion around an axis that is adjacent to a larger object can be used to identify a smaller object as a door of a vehicle in the process of being opened. In some instances, the larger object is not a rigid-body, but can be a combination of parts that can each be (within a given accuracy) approximated as a rigid-body (e.g., spinning wheel of a truck, rotating door of a car, swinging forearms of a pedestrian, etc.). In some implementations, a motion of some parts of the larger object can be approximated as a motion of a rigid body on average. For example, a motion of a whole arm can be approximated as the motion of a rigid body upon averaging over the motion of the forearm relative to the shoulder. A motion of a rigid body can be characterized as a combination of a translational motion, which can be described by a translational vector velocity $\vec{V}$ (hereinafter, "velocity") and a rotational motion, which can be described by an angular velocity $\vec{\Omega}$ (hereinafter, "angular velocity" or "rotational velocity"). In the most general case, the two vector velocities amount to six values, e.g., three components of the velocity $\vec{V}=(V_x, V_y, V_z)$ and three components of the angular velocity $\vec{\Omega}=(\Omega_x, \Omega_y, \Omega_z)$, in Cartesian coordinates (or, alternatively, cylindrical, spherical, or any other system of coordinates). As disclosed below, a significant information about the velocities can be determined based on even a single frame of the sensing system of the AV. Such a single frame can include a mesh of return points corresponding to reflection of different sensing signals, each return point ("point") P including known coordinates (e.g., known from the directional data of the lidar transmitter and the range data extracted from ToF of the reflected sensing signals) and a radial velocity component (herein "radial velocity") $V_r(P)$ of the reflecting surface corresponding to each point P (e.g., extracted by a coherent lidar sensor from Doppler frequency/phase shifts of the reflected signals). In some implementations disclosed, classification of objects can be facilitated by fitting the coordinates and the radial velocity of various clusters—representing parts of a composite object—to a rigid-body equation parameterized by $\vec{V}$ and $\vec{\Omega}$. Herein, "composite" object refers to any object having two or more parts that can move relative to each other. A hypothesis can be formed that a certain cluster of points corresponds to a composite object, such as a pedestrian. The cluster of points can be segmented into two or more sub-clusters with each sub-cluster corresponding to various parts of the composite object performing different motion. For example, arms of a pedestrian swinging (in opposite directions) around the axis passing through the pedestrian's shoulder joints can be indicative of a walking pedestrian. Additionally, the motion of the arms can be superimposed on a translational motion of the body of the pedestrian. Similar patterns can be additionally (or alternatively) detected in the motion of the legs of the pedestrian. In some implementations, segmenting a cluster that corresponds to a composite object into sub-clusters can be performed by various clustering methods (e.g., K-means clustering) in a multi-dimensional space where each point P is identified by a vector $\hat{P}=(X, Y, Z, V_r)$ comprising three (or two, in cases of motion of a given surface) spatial coordinates X, Y, Z and the radial velocity $V_r$. Additional dimensions of the multi-dimensional space can include intensity values, lateral velocities (e.g., determined by additional sensors, as described below, or via fitting to the rigid-body equation), and so on.

FIG. 1A is a diagram illustrating components of an example autonomous vehicle (AV) 100 capable of using motion patterns for object classification and tracking, in accordance with some implementations of the present disclosure. FIG. 1A illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera (s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the AV and, therefore, by combining the distance information with the angular size of the rock, the perception system 132 can determine the linear dimensions of the rock as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can have a motion pattern-assisted segmentation (PAS) module 133. PAS module 133 can receive one or more sensor data frames from the sensing system 120. Each of the sensor frames can include multiple points. Each point can correspond to a reflecting surface from which a signal emitted by the sensing system 120 (e.g., by lidar sensor(s) 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known scanning frequency within the horizontal plane. The velocity data can be provided to PAS module 133 by lidar sensor(s) 122, in one implementation, based on Doppler-assisted sensing technology. PAS module 133 can use one or more algorithms to perform segmentation of point clouds into clusters that correspond to various objects in the environment. In some implementations, PAS module 133 can determine that one or more sub-clusters of points within a composite cluster display patterns of motion that can be recognized, e.g., by a motion pattern-assisted classification (PAC) module 137, as a motion of a known-type composite object. For some types of objects, such as pedestrians or moving vehicles, PAS module 133 and/or PAC module 137 can perform classification based on a single sensing frame. In some instances, multiple sensing frames can be used for accurate pattern-assisted segmentation and/or classification. In some implementations, segmentation can be initially performed by other methods (e.g., geometric segmentation, iterative closest point (ICP) mapping, and so on) whereas pattern-assisted classification can be used to track subsequent motion of the object, e.g., a previously stationary pedestrian starting to walk across the roadway, a previously closed door of a stopped car swinging open, a railroad crossing barrier previously open begins to close, an object previously located within a truck bed begins to fall down, and so on. In these and other instances, as described in more detail below, motion pattern-assisted segmentation and classification can then be used by the perception system 132 for efficient and reliable detection and tracking of objects.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1A. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 1B:
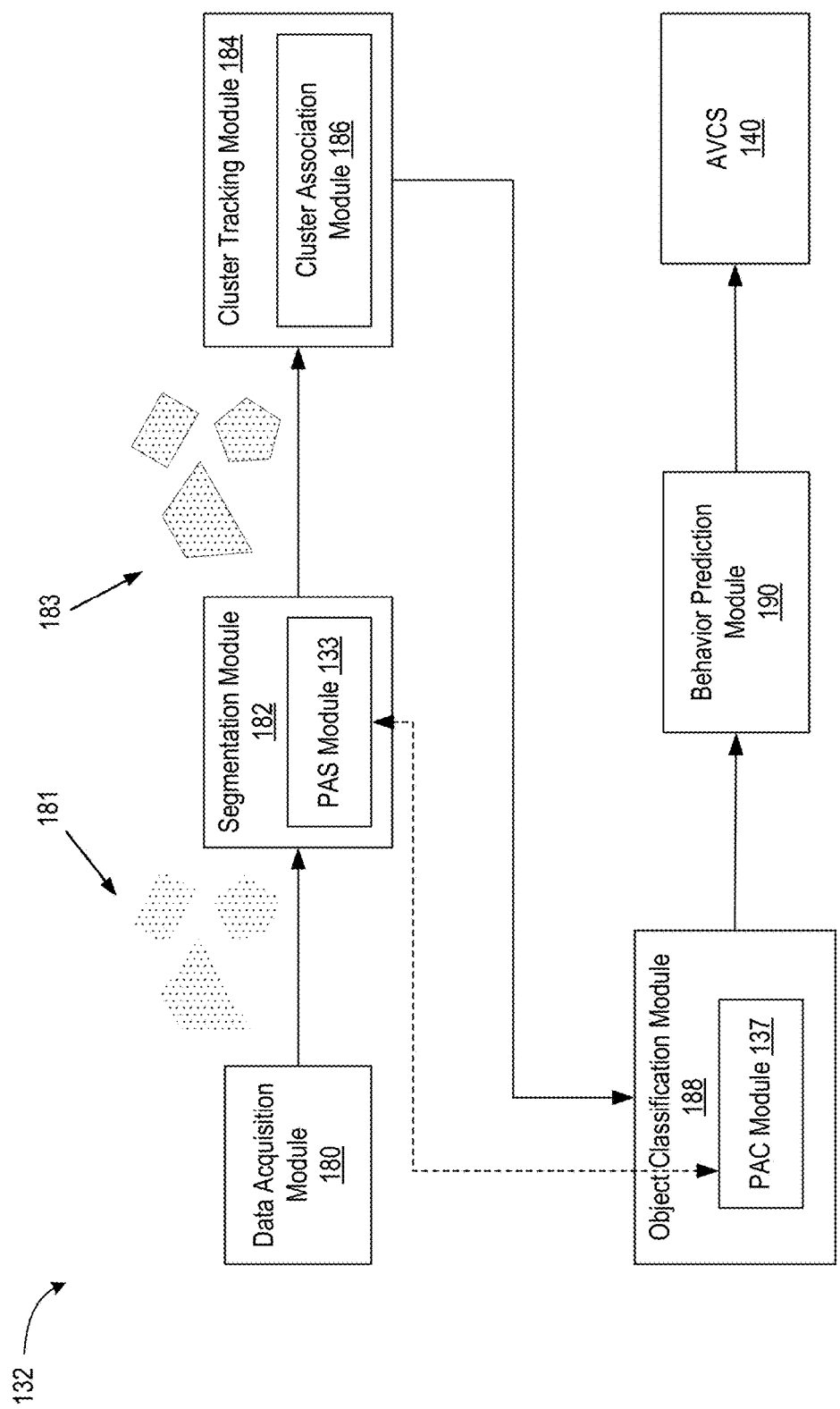
FIG. 1B is a diagram illustrating example architecture of a perception system of the autonomous vehicle of FIG. 1A capable of using motion patterns for object classification and tracking, in accordance with some implementations of the present disclosure.

FIG. 1B is a diagram illustrating example architecture of a perception system of the autonomous vehicle of FIG. 1A capable of using motion patterns for object classification and tracking, in accordance with some implementations of the present disclosure. A perception system illustrated in FIG. 1B can be perception system 132 of FIG. 1A, in one implementation. An input into perception system 132 may be data obtained by sensing system 120, including distance data and radial velocity data obtained by lidar sensor(s) 122. For example, a data acquisition module 180 may associate each (return) point with coordinates and radial velocities of the respective reflecting region. Various points may correspond to different frames, each frame having a timestamp. In some implementations, to account for a rolling shutter that outputs sensing signals sequentially around the field of view, data acquisition block 180 may associate an individual time stamp with each point, by modifying a global reference timestamp of the respective frame with a time correction within a given frame. Output of data acquisition module 180 can be a point cloud 181 of points corresponding to a sensing frame or a portion of such a frame. Point cloud 181 can be input into a segmentation module 182 where various points of point cloud 181 can be grouped into clusters 183 corresponding to different objects. Segmentation can be performed using a variety of approaches. Clusters can be grouped based on proximity of points in space, proximity of radial velocities of various points, or both. In some implementations, segmentation can use various mapping algorithms (such as ICP) that are capable of mapping points of two different sensing frames. Segmentation can involve formation and verification of hypotheses; for example, a hypothesis that a certain cluster corresponds to a single object can be confirmed or disproved based on distribution of measured (radial) velocities of the points in the cluster, on evolution of the cluster between different sensing frames, and/or by other methods and techniques. In some implementations, velocity estimation can be performed by PAS module 133, as disclosed in more detail below. Segmentation can involve fitting radial velocities and coordinates of various sub-clusters of hypothesized composite clusters using rigid-body equation (with one or more sets of translational $\vec{V}$ and rotational $\vec{\Omega}$ velocities, corresponding to various possible objects). Based on the results of the fitting, various hypotheses can be discarded, confirmed, accepted conditionally, subject to additional verification, and so on. Confirmed hypotheses (e.g., output clusters 183) can be provided to a cluster tracking module 184. Cluster tracking module 184 can track motion of the identified clusters 183. In some implementations, tracking of the motion of identified clusters 183 can involve tracking velocities (including angular velocities) of various compound objects using multiple sensing frames with additional timestamps τ. In some implementations, segmentation based on identified $\vec{V}$ and $\vec{\Omega}$ can be used to track motion of the objects, using clusters of points from different sensing frames (sensing frames with different timestamps).

Perception system 132 can also use cluster association module 186 for object tracking. Cluster association module 186 can identify clusters belonging to different sensing frames as being associated with the same object, to facilitate tracking of the object's motion as a function of time. Using cluster associations, objects identified by cluster tracking module 184 may be classified by object classification module 188 as being of a particular type (class), such as cars, trucks, buses motorcycles, bicyclists, pedestrians, stationary objects, and so on. Object classification can be performed using various features of the tracked clusters, such as size, positions, velocity (both rotational and translational), pattern of motion (e.g., how often an object stops, how quickly an object accelerates/decelerates), motion in relation to other objects and so on. Object classification module 188 can include PAC module 137 for motion pattern-assisted classification of composite objects. PAC module 137 can have access to known motion patterns of parts of various objects, e.g., pedestrians, vehicles, bicyclists, opening/closing gates, and so on. Based on segmentation of the point cloud 181 performed by segmentation module 182 and/or tracking of segmented clusters 183 performed by cluster tracking module 184, PAC module 137 can determine that the motion patterns displayed by sub-clusters of composite objects correspond to motion pattern of known objects and can, therefore, classify the objects that correspond to segmented clusters 183 as one of the known objects. As depicted schematically with the dashed line, PAC module 137 can communicate with PAS module 133. For example, PAS module 133 can be capable, at least in some instances, to identify a motion pattern based on a single sensing frame. In such instances, PAS module 133 can communicate the identified motion pattern to PAC module 137 for immediate classification by PAC module 137 (without waiting for additional sensing frames or tracking by cluster tracking module 184). In some instances communication in the reverse direction—from PAC module 137 to PAS module 133 can occur in a similar manner. For example, PAC module 137 can classify (e.g., using various known motion patterns) an object as a jogger running near an edge of the roadway and notify PAS module 133 to inform PAC module 137 about any changes in the pattern of motion of the jogger, such as the jogger stopping, reversing direction, suddenly veering off into the roadway, and the like.

Based on classification of various objects by object classification module 188 as well as previously tracked motion of the objects (by cluster tracking module 184), a behavior prediction module 190 can forecast how the identified objects are likely to move within a certain time horizon, e.g., whether a truck is likely to stop before an intersection, cross the intersection without stopping, turn at the intersection, and so on. Behavior prediction module 190 can also forecast velocity and acceleration/deceleration of the identified objects, responses of the objects to changing traffic and road conditions, and so on. Information from (e.g., forecasts) from behavior prediction module 190 can be provided to AVCS 140 to enable driving path selection, as described above in relation to FIG. 1A.

Figure 2:
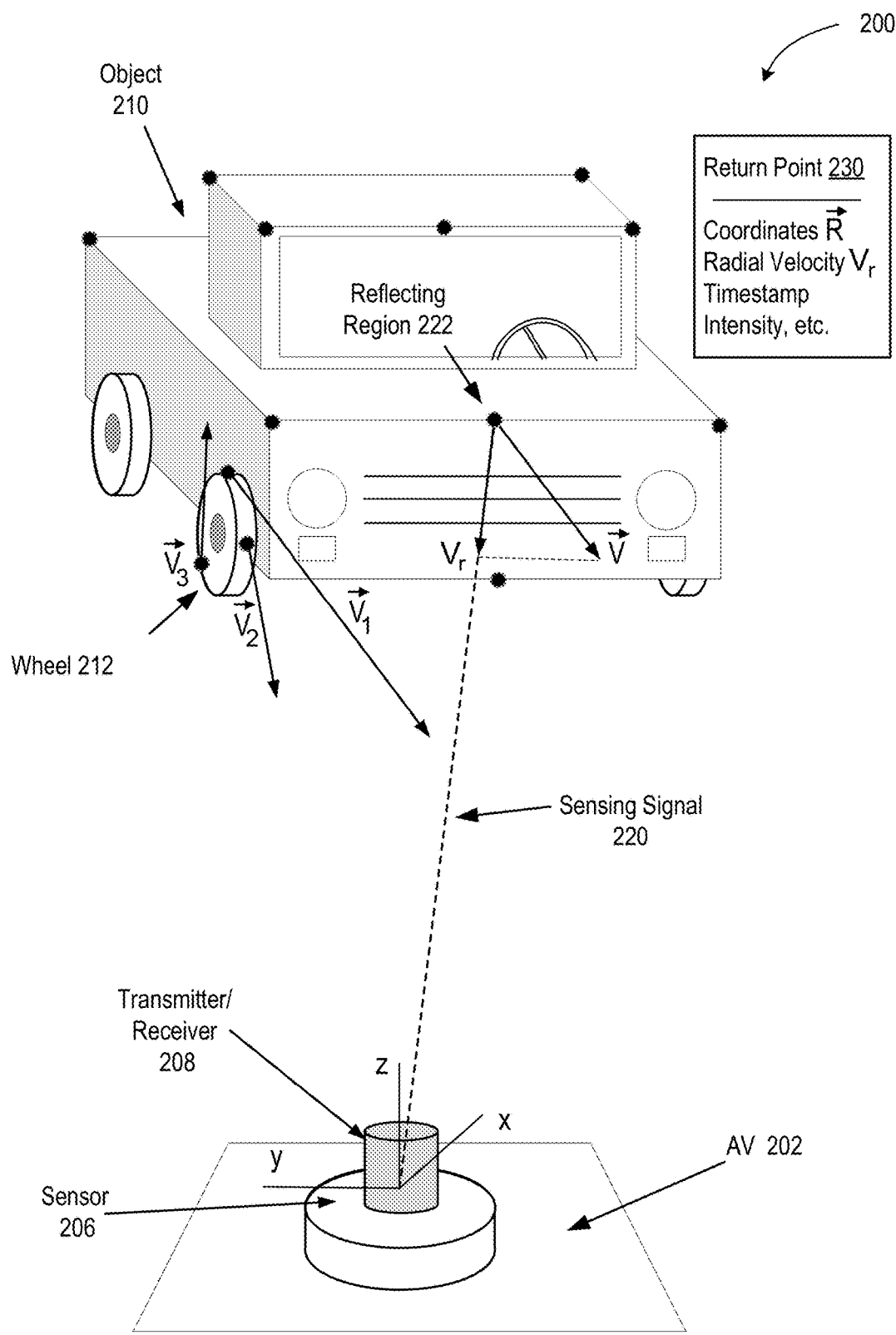
FIG. 2 is an illustration of a velocity sensing setup, as can be used by a perception system of an autonomous vehicle, in accordance with some implementations of the present disclosure.

FIG. 2 is an illustration 200 of a velocity sensing setup, as can be used by a perception system of an autonomous vehicle, in accordance with some implementations of the present disclosure. Depicted in FIG. 2 is a part of the AV 202 with a sensor 206 mounted thereon. Sensor 206 can include a scanning transmitter/receiver 208 capable of transmitting and receiving sensing (e.g., laser, radar, etc.) signals that probes the outside (relative to AV 202) environment. One sensing frame that corresponds to a single cycle of the transmitter 208 can produce multiple return points from various reflecting regions (depicted with black circles) of an object 210 (e.g., a car, a truck, etc.) that is moving with velocity $\vec{V}_O$.

The sensor 206 performs scanning of the driving environment of AV 202. In particular, the sensor 206 can sense multiple return points for each sensing frame. The sensing frames can be separated by time increments Δτ. The time increments refer to time differentials between signals emitted into (or returned from) the same direction, as different directions can be probed with signals at slightly different times. More specifically, Δτ can be a duration of the sensor (e.g., lidar transmitter) cycle (e.g., a period between when the sensor scans the same region again), e.g., with N points along a 360-degree horizontal view, so that any two adjacent directions of sensing can be probed with the time lead/lag of Δτ/N.

As shown in FIG. 2, various objects can reflect a number of signals (e.g., a signal indicated, for illustration, by the dashed line) output by the sensor 206 and generate a number of return points (shown with black dots). The return points (e.g., return point 230) should be understood as data entries (e.g., indexed by the angular directions of the output signals, or in any other way) generated by the perception system 132 based on the measurements performed by sensor 206, as part of the sensing system 120. Each return point can include: (1) distance r to the actual physical reflecting region, and (2) the radial velocity $V_r(j)$ that is equal to the component of the velocity $\vec{V}(j)$, associated with the j-th point. The radial velocity is the component of the vector velocity along the direction (described by unit vector $\vec{n}$) towards (or away from) the sensor 206: $V_r(j) = \vec{V}(j) \cdot \vec{n}$. In some implementations, only some of the return points can include the radial velocity values. For example, while ToF range measurements can be performed for each return point, only some (e.g., every fifth, tenth, and so on) of the points can be probed with the coherent lidar and include the velocity data. The radial velocity $V_r(j)$ is the velocity measured in the reference frame of the AV 202. Accordingly, because in a general case the AV 202 is also moving, the measured velocity $V_r(j)$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.). Accordingly, it shall be assumed herein that various quantities (such as velocities and accelerations) are measured in the reference frame of the AV; the same quantities in any other reference frame (e.g., Earth frame) can then be obtained using appropriate transformation (e.g., Galilean transformations) to the other reference frame based on a known translational and rotational motion of the AV relative to the other reference frame.

A sensing signal 220 can be emitted by a transmitting circuit of the transmitter/receiver 208, reflect from a reflecting region 222 of the object 210, return along the same path and be received by a receiving circuit of the transmitter/receiver 208. The sensing system 120 can associate a return point 230 with the sensing signal 220 and/or reflecting region 222. The return point 230 can include various data that can be extracted from the sensing signal 220, such as the coordinates (which can be in any appropriate system of coordinates, e.g., Cartesian coordinates $\vec{R}=(x, y, z)$, spherical coordinates $\vec{R}=(r, \theta, \phi)$, cylindrical coordinates $\vec{R}=(r, \phi, z)$, or any other system of coordinates; the origin of the coordinate system can be associated with the transmitter/receiver 208, as shown. The returns point can also include such data as the radial velocity $V_r$, a timestamp $\tau$ associated with the sensing signal 220 (e.g., the time of the signal emission or return), the intensity of the returned signal, and other information such as the polarization of the emitted and/or received signal, and the like. Although only the data associated with the return point 230 is depicted in FIG. 2, other return points associated with the reflecting regions depicted with black circles can include the same or similar type of information.

Object 210 can have a part, e.g. wheel 212, that while being attached to other parts of object 210, performs a motion that (in addition to the motion imparted by the object, such as the translational motion with velocity $\vec{V}_O$) has distinct features specific to the part. For example, the depicted wheel 212 rotates around a horizontal axis. As a result, various points of the wheel 212 have velocities (e.g., $\vec{V}_1, \vec{V}_2, \vec{V}_3$) of different directions and magnitudes, which can be detected by sensor 206 as long as the wheel 212 is not spinning exactly within a plane of view (the plane that is perpendicular to the line of view from the transmitter/receiver 208). In those instances, where the wheel 212 is spinning within the field of view, additional sensing frames (e.g. corresponding to later or earlier cycles of transmitter/receiver 208) can be obtained in which the wheel has moved outside the field of view so that the transmitter/receiver 208 can identify non-zero radial components of velocities for at least one of the sensing frames. In some implementations, a second (third, etc.) sensor located differently from the first sensor (as explained in more detail below) can be used, so that the lines of sight from the two (three, etc.) sensors are not parallel to each other and the radial components of velocities for at least some sensors can be detected using already a single sensing frame.

The pattern of velocities (e.g., $\vec{V}_1, \vec{V}_2, \vec{V}_3$) of a part of the object 210 (e.g., wheel 212, arms of a pedestrian, etc.), as represented via the detected radial velocities (e.g., $V_{1r}, V_{2r}, V_{3r}$), can be used by PAS module 133 and or PAC module 137 for classification of both the part of the composite object as well as the composite object itself. Specifically, in the example shown in FIG. 2, PAS module 133 can segment a sub-cluster—from the cluster of points belonging to object 210—that corresponds to a distinctly moving part of object 210 and identify, based on the pattern of the motion of the part of the object (e.g., wheel 212) that the part is a wheel. Additionally, based on the location, size, speed, and character of the motion of the part of the object, as well as the size, velocity, and character of motion of the composite object as a whole, PAC module 137 can identify object 210 as a vehicle.

In some implementations, motion of a part of a larger object can be approximated as a rigid-body motion. For example, a rotating wheel of a car, a lower leg (or a forearm) of a pedestrian, etc., can be approximated as a rigid-body motion. A rigid body should be understood as a model body in which distances between various points remain constant (or approximately constant) within the course of the body's motion. Specifically, a sub-cluster identified (segmented) as associated with a part of a composite object (which performs a motion that is sufficiently distinct from the motion of the rest of the composite object) can be characterized by the velocity distribution is which an element of the body having a radius-vector $\vec{R}$ fits the rigid-body equation:

$$\vec{V}=\vec{V}_O+\vec{\Omega}\times(\vec{R}-\vec{R}_O),$$

where $\vec{R}_O$ is the radius vector of some reference point. The reference point O can be any element of the body, e.g. an element associated with a particular return point or even a point in space outside the object (or unrelated to the object) be arbitrary since the same rigid-body equation exists for any other reference point O', as $$\vec{V} = \vec{V}_O + \vec{\Omega}\times(\vec{R}-\vec{R}_{O'}-\vec{R}_O+\vec{R}_{O'}) = \vec{V}_{O'} + \vec{\Omega}\times(\vec{R}-\vec{R}_{O'}),$$

where $\vec{V}_{O'}=\vec{V}_O+\vec{\Omega}\times(\vec{R}_{O'}-\vec{R}_O)$ is the linear velocity of the other reference point O'. Although the linear velocity changes when the reference point is changed, the angular velocity is independent of the choice of the reference point. This independence provides additional flexibility by enabling to choose the reference point based on convenience (e.g., near the center of the sub-cluster of points detected by the sensing system 120). Reference point O may be regarded as the center of body rotation. A freedom to choose a reference point reflects a possibility to represent an arbitrary displacement of a rigid body via an infinite number of possible combinations of a rotations (about an arbitrarily chosen center of rotation but to the same angle and around the same axis) and a translation. (An exception is a purely translational motion.) Accordingly, in some implementations, it may be convenient to choose reference point O to be somewhere inside the object (albeit not necessarily chosen to be close to the object's geometric center or center of mass). In other implementations, it may be convenient to represent object's motion as a pure rotation around an axis parallel to $\vec{\Omega}$ (with no translations within the plane perpendicular to this axis) and a translation along this axis. Such choice of the rotation center (hereinafter referred to as "pure rotation" setup) is unique (up to arbitrary translation along the axis) and may be determined from the condition, $\vec{V}_{O'}=\vec{V}_O+\vec{\Omega}\times(\vec{R}_{O'}-\vec{R}_O)=0$, which gives $$\vec{R}_{O'} = C\vec{\Omega} + \frac{1}{\Omega^2}(\vec{\Omega} \times \vec{V}_O + (\vec{\Omega} \times \vec{R}_O) \times \vec{\Omega}),$$

where C is an arbitrary number. At small angular velocities (when the object performs mostly translational motion), as seen from the last expression, rotation center is located at large distances. Accordingly, for the sake of numerical accuracy, in some implementations, possible distances from an object to its center of rotation may be limited, e.g., a pure rotation setup may be changed to a combined rotational-translational setup once it is determined that the center of rotations is farther than some predetermined distance (e.g., a certain number of the object's longest dimension).

PAS module 133 and/or PAC module 137 can fit radial velocity data and coordinate data using the rigid-body equation for various sets of return points of the point cloud and identify reflecting regions that fit the same set of rigid-body parameters (within a target accuracy), such as $\vec{V}_O$, $\vec{\Omega}$. The identified regions can be associated with respective sub-clusters of the return points. The sub-clusters can be distinct (but nonetheless proximate) to larger collections of points with whom the sub-clusters can be hypothesized to represent a composite object. The composite object, in turn, can be classified based on identified parameters of several of its sub-clusters as well as the rest (e.g., the main body) of the object. The following figures illustrate some of motion patterns that can be used for classification of composite objects that can be present in driving environments of AVs.

Figure 3A:
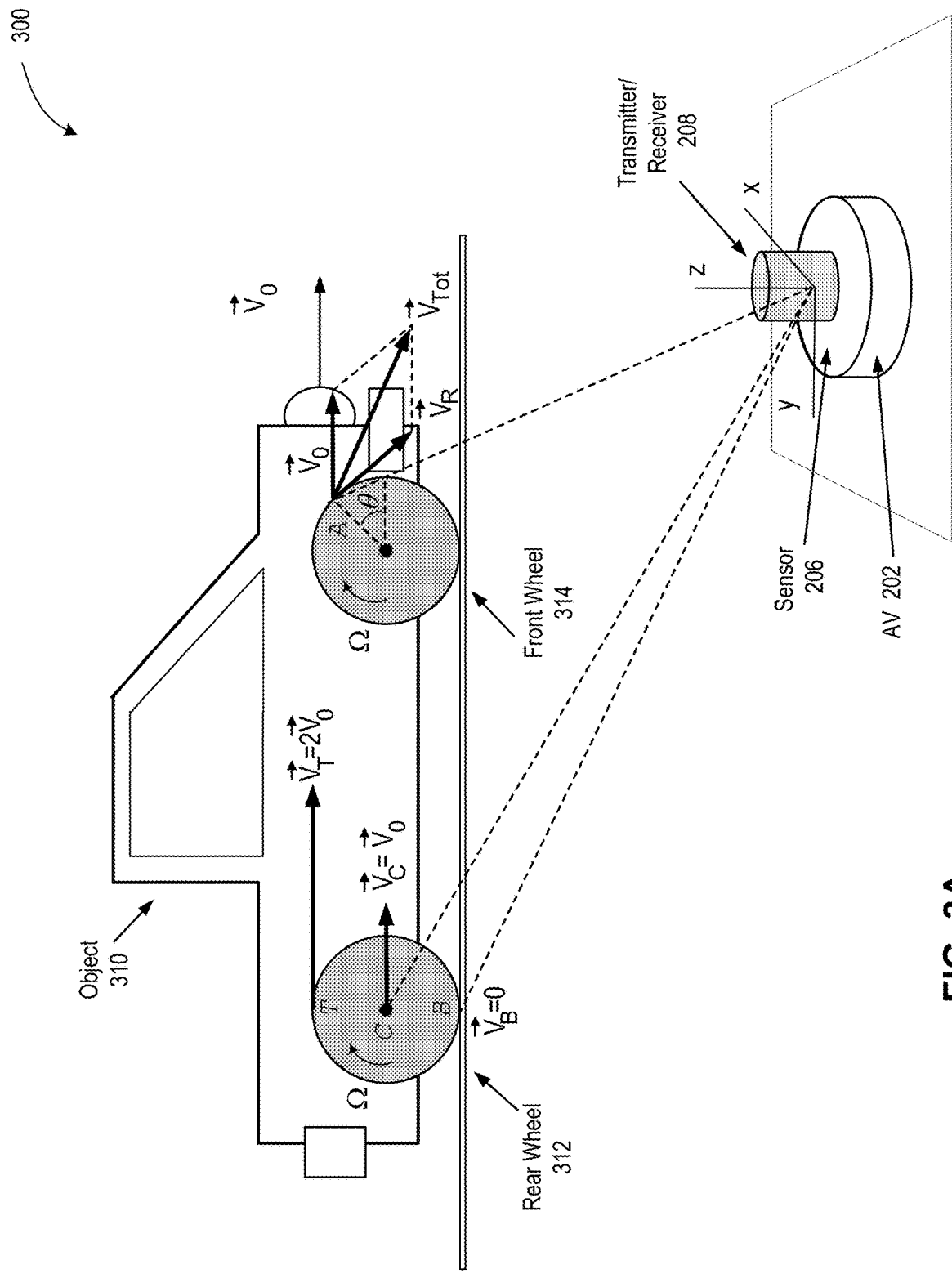
FIG. 3A illustrates how the sensing data that includes information about radial velocities can be used in classification of wheeled objects encountered in autonomous driving applications, in accordance with some implementations of the present disclosure.

FIG. 3A illustrates how the sensing data that includes information about radial velocities can be used in classification of wheeled objects encountered in autonomous driving applications, in accordance with some implementations of the present disclosure. Although FIG. 3A depicts a truck, any other objects having wheels can be detected and classified in a similar manner, including but not limited to motorcycles, bicycles, unicycles, scooters, wheelchairs, shopping carts, and the like. The sensing setup can be similar to the setup of FIG. 2, including multiple signals output by transmitter/receiver 208 of sensor 206 mounted on AV 202, in one implementation. Sensed object 310 can include one or more wheels making contact with roadway or any other surface. Depicted are wheels that do not slip on the roadway; as a result, the bottom point B (e.g. of rear wheel 312) has zero velocity (relative to the roadway). Such cancellation of the velocity comes as a result of superposition of two motions: a translational motion of the object 310 as a whole with velocity $\vec{V}_O$ (which is also the velocity of the center point C of the wheel, e.g., an axle supporting wheel 312 and attached to object 310) and angular velocity $\Omega$ of rotation of the wheel 312 around the axle, such that $\Omega = V_O/R$, where R is the radius of the wheel. As the two motions occur in the opposite directions near B, the total velocity vanishes at B. In contrast, the two motions occur in the same direction near the top point T where the total velocity, therefore, doubles: $V_T = 2V_O$. For an arbitrary point A, as shown in the context of a front wheel 314, the two velocities are added in vector form, with the total velocity $\vec{V}_{Tot}$ being the vector sum of the rotational velocity $V_R = \Omega r = V_O$ along the tangential direction and the same translational velocity $\vec{V}_O$, so that the horizontal and vertical components of the total velocity are (as functions of the radial distance r angle $\theta$)

$$V_h = V_0 + \Omega r \sin\theta = V_0\left(1 + \frac{r}{R}\sin\theta\right),$$

$$V_v = -\Omega r \cos\theta = -V_0 \frac{r}{R}\cos\theta.$$

The radial component of the velocity (e.g., as measured by sensor 206) is, therefore, $$V_r(r, \theta) = (V_h \cos\alpha + V_v \sin\alpha)\cos\phi = V_0\left(\cos\alpha + \frac{r}{R}\sin(\theta - \alpha)\right)\cos\phi,$$

where $\alpha$ is the angle that the line of view makes with the road surface and $\phi$ is the angle that the line of view makes with the vertical plane of the wheel. The sensitivity of the radial velocimetry is higher for smaller angles $\phi$ (the object moving towards or away from the sensor). At large distances, angle $\alpha$ can be approximated as zero. Based on the measured distribution $V_r(r, \theta)$ for a sub-cluster of return points, e.g., using various fitting procedures (such as the least square error method), PAS module 133 can determine the radius R of the wheel as well as the combination of the translational velocity and angle $\phi$: $V_0 \cos\phi$. Disambiguation of the velocity $V_0$ from the value of the combination $V_0 \cos\phi$ can be performed, for example, as follows. PAS module 133 can determine the visible shape of the wheel. For example, PAS module 133 can determine that the outer boundary of the sub-cluster of points has the shape of an ellipse with semi-axes a and b, where a≥b. PAS module 137 can then determine that the radius of the wheel is R=a and that the angle of view $\phi$ is such that $\cos\phi = b/a$. Velocity $V_0$ can then be obtained from the value $V_0 \cos\phi$ and the determined $\cos\phi$. Accordingly, PAS module 133 can identify the size of the part (e.g., the wheel), the direction of motion of the part (as well as the whole object), and the speed of the part's motion. In some implementations, when a vehicle is turning, its front wheel(s) make a different angle $\phi$ with the line of sight than the rear wheels. By detecting such difference $\Delta\phi$, PAS module 133 can identify in which direction the vehicle is turning, as well as the radius of the turn.

Figure 3B:
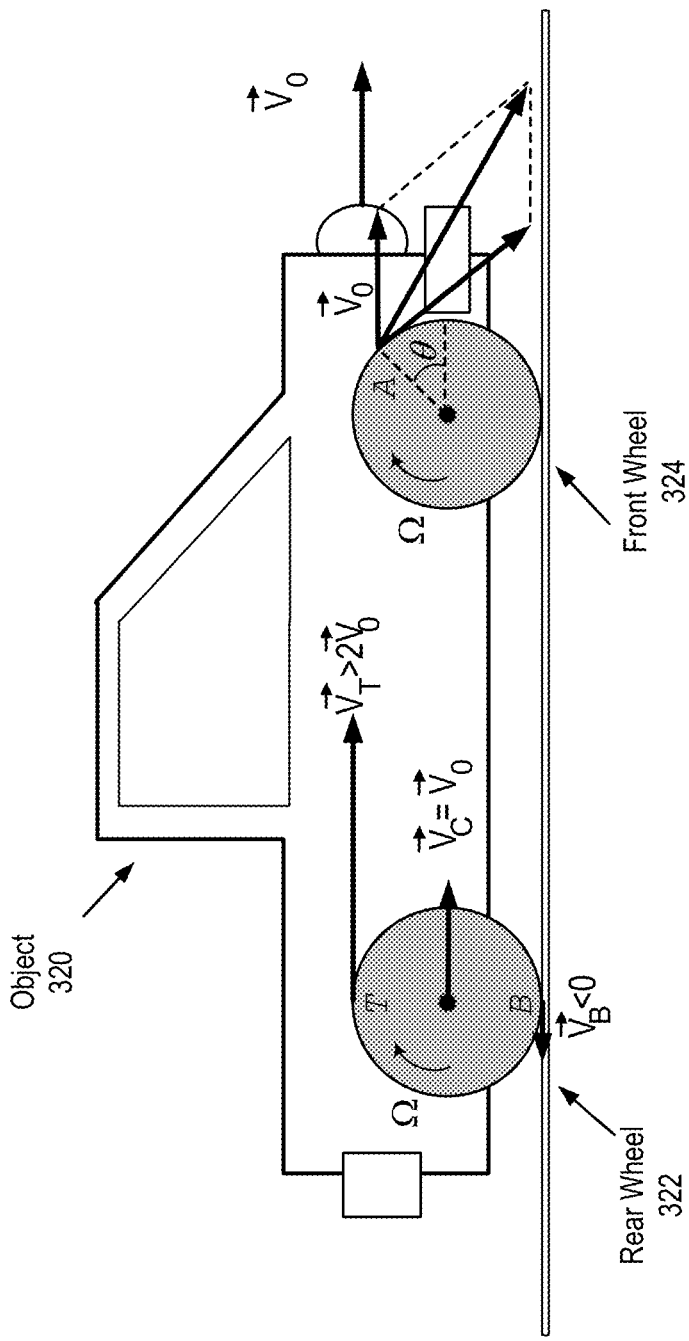
FIG. 3B illustrates how the sensing data that includes information about radial velocities can be used in detection of slipping in wheeled objects, in accordance with some implementations of the present disclosure.

FIG. 3B illustrates how the sensing data that includes information about radial velocities can be used in detection of slipping in wheeled objects, in accordance with some implementations of the present disclosure. Although FIG. 3B depicts an object 320 (e.g., a truck), any other objects having wheels can be detected and classified in a similar manner. Depicted is a rear wheel 322 that slips on the roadway, with the bottom point B having a negative (pointed rearward) velocity relative to the roadway. Such a situation can occur when velocity $V_0$ of the translational motion of object 320 is less than the value of the linear velocity of rotational motion at wheel's edge ($\Omega R$): $\Omega R > V_0$. As a result, near the top (7) of the wheel, $V_T > 2V_0$. At an arbitrary point A, the total velocity $\vec{V}_{Tot}$ has the horizontal and vertical components, $$V_h = V_0 + \Omega r \sin\theta, V_v = -\Omega r \cos\theta,$$

so that the radial component of this velocity (as detected by sensor 206) is $$V_r(r, \theta) = (V_h \cos\alpha + V_v \sin\alpha)\cos\phi = (V_0\cos\alpha + \Omega r \sin(\theta - \alpha))\cos\phi.$$

By measuring the radial velocity distribution $V_r(r, \theta)$ for a sub-cluster of return points, PAS module 133 can determine the radius R of the wheel, angular velocity $\Omega$, and translational velocity $V_0$ to ascertain the relation between $\Omega R$ and $V_0$. If it is identified that $\Omega R = V_0$ (within the accuracy of the velocity data), PAS module 133 can determine that the vehicle (or another wheeled object) is moving along the roadway without slipping. If it is identified that $\Omega R \neq V_0$, PAS module 133 can determine that the vehicle experiences diminished traction. For example, a situation $\Omega R > V_0$ can indicate that the vehicle is losing traction while accelerating or starting motion on a slippery surface (e.g., ice or wet surface). An opposite situation of $\Omega R < V_0$ can indicate that the vehicle is losing traction while attempting to slow down on a slippery surface. Based on the detection of the loss of traction, performed by PAS module 133 and/or PAC module 137, behavior prediction module 190 can project how the respective vehicle is likely to move within a specific time horizon. For example if the observed vehicle is approaching an intersection and it is detected that the angular velocity of the wheels of the vehicle is too small given the velocity of the vehicle ($\Omega < V_0/R$), the behavior prediction module 190 can take this information as an indication that the vehicle is attempting to slow down but, possibly, will not be able to stop before entering the intersection. Behavior prediction module 190 can, therefore, output instructions to AVCS 140 to delay entry of the AV into the intersection. Similarly, if the observed vehicle is attempting to start motion from a stop sign, and it is detected that the angular velocity of the wheels of the vehicle is too large for the velocity of the vehicle ($\Omega > V_0/R$), the behavior prediction module 190 can take this as an indication that the road conditions (e.g., traction) at the intersection are unfavorable. Behavior prediction module 190 can, therefore, output instructions to AVCS 140 to begin early braking of the AV in order and ensure that the AV comes to a complete stop before entering the intersection.

In some instances, once one or more vehicles are detected whose wheels are losing traction (e.g., spinning too fast or too slow for the velocity of the respective vehicle), behavior prediction module 190 (or another component of the autonomous vehicle) can cause the AVCS 140 to change a speed mode (e.g., to slow down), increase distance to other vehicles, modify a braking mode (e.g., use earlier but lighter application of pressure to the brakes), and so on. Additionally, a detection of an icy road can be used to check that the optical sensing system is operating properly. For example, a surface of an icy (or wet) road can be expected to have a certain (e.g., increased) degree of reflectivity. Accordingly, if it is detected that the road is icy (or wet), but the reflectivity of the road does not match the expectations, behavior prediction module 190 (or another component of the autonomous vehicle) can take it as an indication that the optical sensing system can be operating under suboptimal conditions (e.g., the field lenses of the lidars/cameras are occluded by grime, mist, and the like).

Figures 4A, 4B:
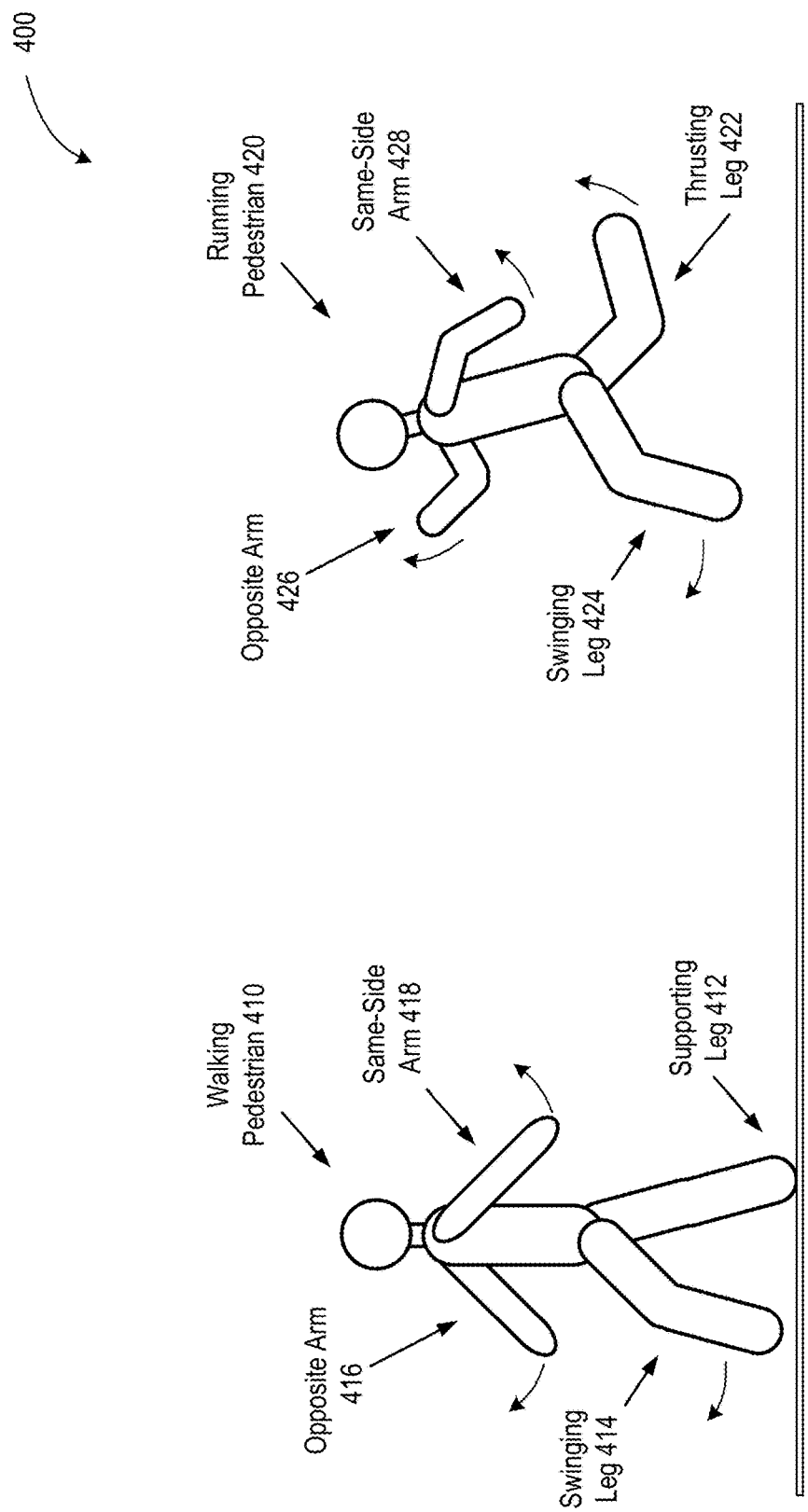
FIG. 4A illustrates motion pattern-assisted classification of walking pedestrians in autonomous driving applications, in accordance with some implementations of the present disclosure.
FIG. 4B illustrates motion pattern-assisted classification of running pedestrians in autonomous driving applications, in accordance with some implementations of the present disclosure.

FIG. 4A illustrates motion pattern-assisted classification of walking pedestrians in autonomous driving applications, in accordance with some implementations of the present disclosure. During a walking gait cycle, a walking pedestrian 410 can display a pattern of velocities associated with the motion of arms and/or legs that provides balance during walking. Specifically, a foot of a supporting leg 412 planted on the ground provides a pivot point for a forward motion of the pedestrian 410. Meanwhile, the opposite swinging leg 412 is extended forward to accept the weight of the pedestrian and to provide support during the next half a period of the walking motion. The next half a period is characterized by the changed role of the two legs with leg 412 becoming a supporting leg and leg 414 swinging forward. Accordingly, a motion pattern of the leg motion during walking displays a relatively slow forward rotation of the supporting leg and a relatively fast forward motion of the swinging leg. At least one leg is planted on the ground at all times, with both legs planted for a portion of the walking cycle. Additionally, to counterbalance the swinging leg motion, arms of the walking pedestrian 410 can swing in the direction opposite to the respective leg. Specifically, the arm 416 that is opposite to the swinging leg 412 moves forward whereas the same-side arm 418 swings backwards, both arms moving with approximately equal angular velocity (in the reference frame of the pedestrian).

In some implementations, motion pattern-assisted identification of walking pedestrians can be performed as follows. Segmentation module 182 can identify, e.g., using geometric segmentation methods, a cluster of points that is likely to represent an object. PAS module 133 can access velocity data for various points of the cluster and identify patterns of motion of sub-clusters of points moving in a distinct manner compared with other points of the cluster. For example, some points of the first cluster can be moving in a particular (e.g., forward) direction with approximately equal velocity—e.g., head, torso, hips. Other points, e.g., points belonging to a first cluster, can exhibit an additional motion (superimposed on the cluster's motion), e.g. a motion of a leg swinging forward. The swinging motion can be a combination of the thigh of the swinging leg rotating at the hip joint and the lower leg rotating (with a different, e.g., greater, angular velocity) at the knee joint. Other sub-clusters can similarly be identified as corresponding to the rotational motion of the upper extremities, e.g., the arms swinging in opposite direction. Based on the identification of one or more distinctly moving sub-clusters, falling within a pattern of a walking pedestrian, PAS module 133 can classify the points of the cluster (including sub-clusters) as associated with a pedestrian. In some implementations, classification can be performed based on a single sub-cluster, such as the swinging leg sub-cluster, as in some instances a walking pedestrian can be carrying a load (or missing an arm), which can prevent one or both arms from performing a swinging motion. In some implementations, additional arm swinging, if detected, can be used for increased confidence of object classification as a walking pedestrian. In some instances, detection of a walking pedestrian can be successful based on a single sensing frame. In other instances, successful detection can be performed using two or more sensing frames capturing different phases of the walking gait cycle.

FIG. 4B illustrates motion pattern-assisted classification of running pedestrians in autonomous driving applications, in accordance with some implementations of the present disclosure. During a running gait cycle, a running pedestrian 420 can perform a sequence of jumping moves in which a thrusting leg 424 propels the running pedestrian forward. The pedestrian then lands on the swinging leg 422 in preparation for the next jump where the role of the two legs is switched. Accordingly, a pattern of the leg motion during the running gait is characterized by a greater involvement of both legs (which perform roughly opposite motions), occurrence of an airborne phase (during which not foot is on the ground), and absence of a phase where both feet are planted on the ground. To counterbalance the leg motion, arms of the running pedestrian 420 swing in the direction opposite to the respective leg. Specifically, the arm 426 that is opposite to the swinging leg 422 moves forward whereas the same-side arm 428 swings backwards, with both arms moving with approximately equal angular velocity. Additionally, swinging arms (in most runners) are bent at elbow joints to a larger extent compared with the arms of a walking pedestrian 410.

In some implementations, motion pattern-assisted identification of running pedestrians can be performed as follows. Segmentation module 182 can identify, e.g., using geometric segmentation methods, a cluster of points that is likely to represent an object. PAS module 133 can access velocity data for various points of the cluster and identify patterns of motion of sub-clusters of points moving in a distinct manner compared with other points of the cluster. For example, some points of the cluster can be moving in a particular (e.g., forward) direction with approximately equal velocity—e.g., head, torso, hips. Other points, e.g., points belonging to a first sub-cluster, can exhibit an additional motion (superimposed on the cluster's motion), e.g., corresponding to a leg swinging forward. The swinging motion can be a combination of the thigh of the swinging leg rotating at the hip joint and the lower leg rotating (with a greater, angular velocity) at the knee joint. Another sub-cluster can exhibit an additional motion (superimposed on the cluster's motion) that is distinct from the motion of the first sub-cluster, e.g., corresponding to the thrusting leg rotating upward. The rotating motion can be a combination of a weaker (lower angular velocity) rotation of the thigh of the thrusting leg at the hip joint and a stronger (higher angular velocity) rotation of the lower leg swinging at the knee joint. The rotational motions of the swinging leg and the thrusting leg occur in opposite directions, as depicted in FIG. 4B. Other sub-clusters can similarly be identified as corresponding to the rotational motion of the upper extremities, e.g., the arms swinging in opposite directions at shoulder joints. Based on the identification of one or more distinctly moving sub-clusters, falling within a pattern of a running pedestrian, PAS module 133 can classify the points of the cluster (including sub-clusters) as associated with a running pedestrian. In some implementations, classification can be performed based on a single sub-cluster, such as the swinging leg sub-cluster, as in some instances a running pedestrian is carrying an object (or missing an arm) that can prevent one or both arms from performing a swinging motion. In some implementations, additional arm swinging, if detected, can be used for increased confidence of object classification as a (running) pedestrian. In some instances, detection of a running pedestrian can be successful based on a single sensing frame. In other instances, successful detection can be performed using two or more sensing frames capturing different phases of the running gait cycle.

Figure 4C:
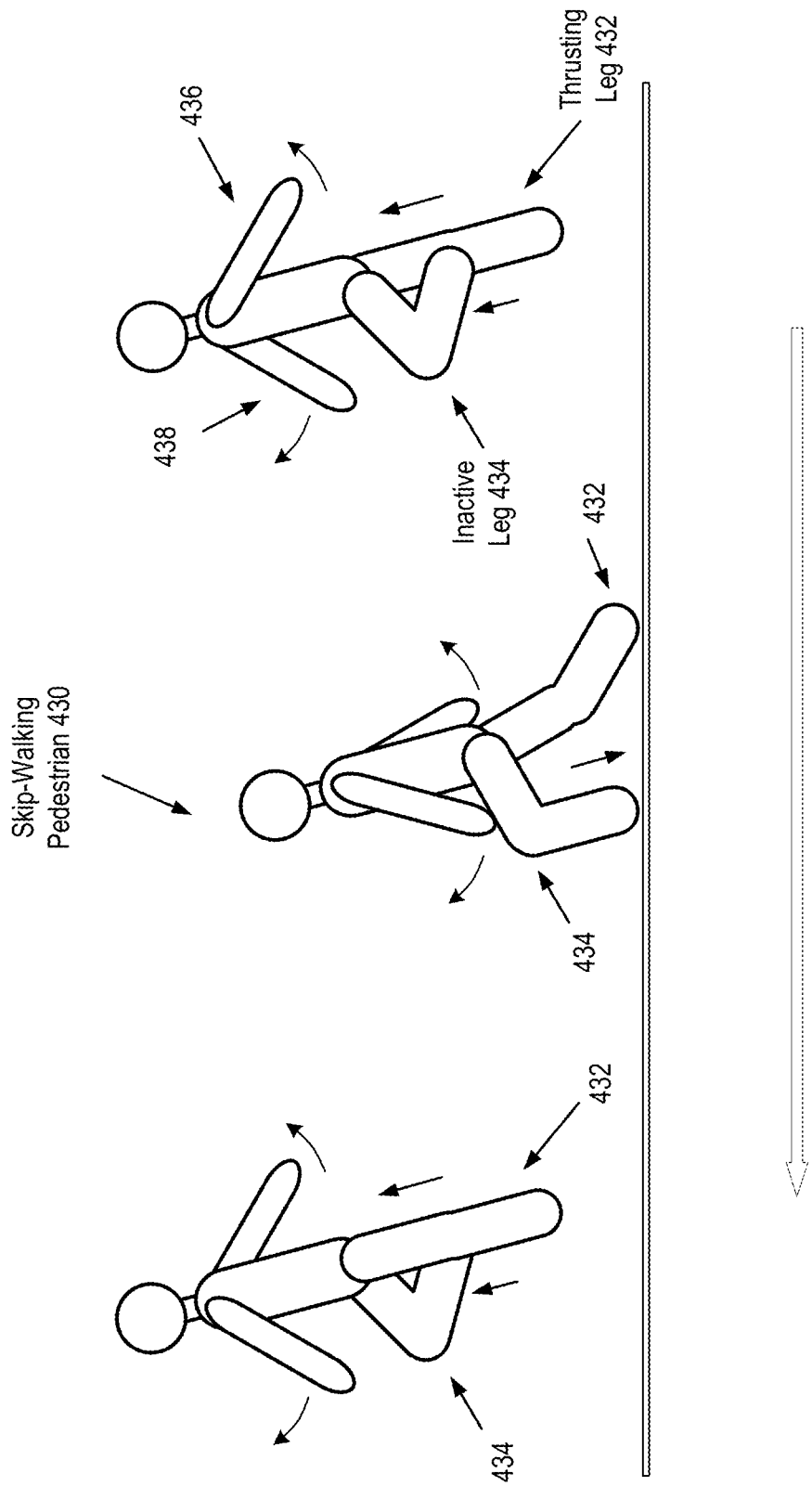
FIG. 4C illustrates motion pattern-assisted classification of skip-walking pedestrians in autonomous driving applications, in accordance with some implementations of the present disclosure.

FIG. 4C illustrates motion pattern-assisted classification of skip-walking pedestrians in autonomous driving applications, in accordance with some implementations of the present disclosure. Skipping motion is sometimes exercised by young children (although this type of motion is not limited to children), and it is advantageous to develop perception functionality capable of detecting such a motion. During a skip-walking (skip-running) gait cycle, a pedestrian 430 (e.g., a child) can perform a sequence of jumps with a significant vertical component of the velocity, as shown in FIG. 4C (from right to left). The cycle depicted includes (right picture) propelling the child into air (up and in the forward direction) with a push of the child's thrusting leg 432 while the other leg 434 remains relatively inactive. The arms 436 of the child and 438 are swinging in opposite directions. Leg 434 remains inactive until after the thrusting leg 432 makes contact with the ground (middle picture) and assumes the weight of the landing child. At this point, leg 434 makes its own contact with the ground, the forward motion of the child rolls the weight of the child to leg 434, and leg 434 becomes the thrusting leg for the next half-cycle propelling child into air (left picture) while leg 432 becomes inactive until the next landing, and so on. The arms 436 and 438 are now swinging in the directions opposite to the directions of swinging (for each respective arm) during previous half-cycle. The pattern of the leg motion during the skip-walking gait is characterized by large (greater than in the instances of walking and/or running) vertical component of velocity of all body parts and the mostly vertical motion of the legs with larger velocities of the inactive leg than the thrusting leg, as the inactive leg travels a larger distance than the thrusting leg during the respecting half-cycle of skip walking gait. a greater involvement of both legs (which perform roughly opposite motions), existence of an airborne phase, and an absence of a phase where both feet are planted on the ground.

In some implementations, motion pattern-assisted identification of skip-walking pedestrians can be performed as follows. Segmentation module 182 can identify, e.g., using geometric segmentation methods, a cluster of points that is likely to represent an object. PAS module 133 can access velocity data for various points of the cluster and identify patterns of motion of sub-clusters of points moving in a distinct manner compared with other points of the cluster. For example, some points of the cluster can be moving in a direction with a substantial vertical component—e.g., head, torso, hips, legs. Other points, e.g., belonging to a first sub-cluster associated with the inactive leg, can exhibit an additional motion with increased in substantially the same direction (e.g., up and forward) superimposed on the cluster's motion. Additional sub-clusters can exhibit distinct motion that corresponds to the rotational motion of the upper extremities, e.g., the arms swinging in opposite direction at shoulder joints. Based on the identification of distinctly upward direction of the main cluster, and/or additional patterns of the inactive leg and/or swinging arms, PAS module 133 can classify the points of the cluster (including sub-clusters) as associated with a skip-walking pedestrian. In some implementations, classification can be performed based on a main cluster exhibiting a combination of upward and horizontal motions. In some implementations, additional arm(s) swinging, if detected, can be used for increased confidence of object classification as a (walk-skipping) pedestrian. In some instances, detection of a walk-skipping pedestrian can be successful based on a single sensing frame. In other instances, successful detection can be performed using two or more sensing frames capturing different phases of the walk-skipping gait cycle.

Figure 5:
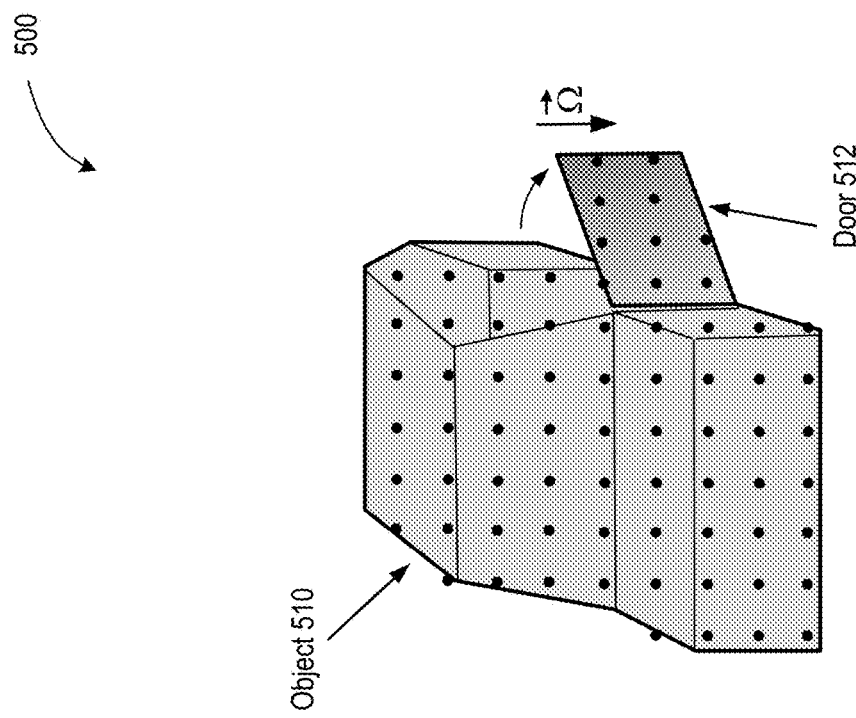
FIG. 5 illustrates motion pattern-assisted identification of objects based on a motion onset in autonomous driving applications, in accordance with some implementations of the present disclosure.
Figure 5:
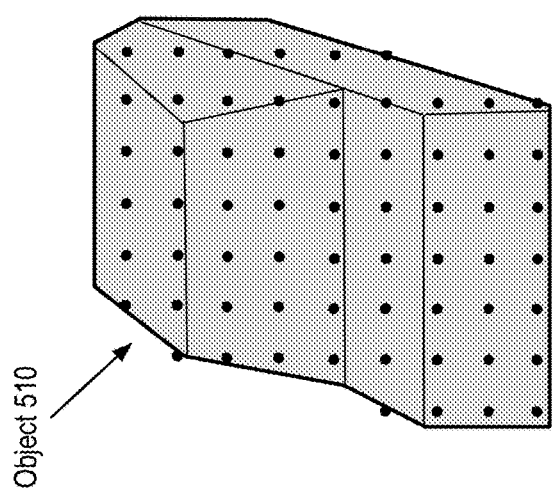

FIG. 5 illustrates motion pattern-assisted identification of objects based on a motion onset in autonomous driving applications, in accordance with some implementations of the present disclosure. Depicted is a field of view 500 that can correspond to a portion of a sensing frame. The return points (the point cloud) are indicated with black dots. The white region of the field of view 500 depicts a region where no reflections are detected and, therefore, no return data points are generated. A return point is indicative of a presence of an object (along the respective direction of the sensing signal) at some distance from the sensor. Conversely, an absence of a return point (at least within the range of detection) indicates that no object is present along the respective direction. Each point can have an associated range (ToF) data as well as a radial velocity (Doppler) data. The radial velocity data can be treated as a velocity field defined on the discrete set of points of the point cloud.

A vehicle 510 (e.g., a parked or stopped vehicle) can generate multiple return points—cluster—depicted with black dots. The cluster of points can indicate a uniform pattern of (radial) velocities associated with a stationary car. In particular, the pattern of the velocity values in the cluster can indicate that the points in the cluster have the same velocity value, $-\vec{V}$, where $\vec{V}$ is the velocity of the AV relative to ground. The value of the detected radial velocity associated with specific return points is indicated in FIG. 5 by shading, with darker regions corresponding to higher detected velocities and lighter regions corresponding to lower velocities. The left picture depicts a velocity distribution of the stationary vehicle with all doors closed. At some moment, a door 512 of the vehicle 510 is opened, as depicted in the right picture. As the door 512 is swinging in the outward direction, various reflecting surfaces of the door perform a rotational motion with some angular velocity $\vec{\Omega}$ pointed along the vertical direction (downward, in case of the shown left-side door). Correspondingly, the swinging door 512 can generate additional return points with the radial velocity increasing with the distance from the axis of rotation (e.g., a vertical axis passing through the door hinges), as depicted with the non-uniform shading.

Accordingly, in some implementations, after segmentation module 182 has identified a cluster of points that corresponds to a vehicle (or any other object), PAS module 133 can detect an appearance, in a vicinity of (or within) the previously identified cluster, of an additional cluster of points having a velocity pattern that is indicative of a swinging motion, such as a pattern of a radial velocity with approximately linear dependence on the distance from some reference axis. As a result, PAC module 137 can classify the additional cluster of points as a door (or any other object) that is being in the process of opening (or some other motion). Subsequently, the behavior prediction module 190 can determine that an occupant of the vehicle is about to exit the vehicle, and provide instructions to AVCS 140 to slow down, move away from the vehicle/door, stop, and the like. Appearance of additional return points next to the car door can indicate that the occupant of the vehicle has begun exiting the vehicle.

Although in the context of FIG. 5, an illustrative example of a door being opened is described, similar pattern-assisted identification/classification method can be used in other settings, such as a gate starting to open (in an outward or inward direction), a railroad crossing barrier being lowered or raised, an object falling out of the bed of a truck or the truck of a car, a tire/wheel detaching from a vehicle, a vehicle parked near a side of a roadway starting to move into the roadway, and the like.

In some implementations, identification of distinctly moving sub-clusters within larger clusters can be performed based on various methods of clustering, such as K-means clustering. For example, clustering can be performed by associating each data point j with a vector in a multi-dimensional space, such as a four-dimensional space that includes three spatial dimensions (two spatial dimensions in the instances of objects moving on a surface), $\hat{X}_j^T=(x_j, y_j, r_j, V_{rj})$, and then further associating the point with a k-th sub-cluster of K sub-clusters ($1 \leq k \leq K$) that are hypothesized to be present within the point cloud. A k-th sub-cluster may have a centroid located at some point in the multidimensional space, $\hat{X}_k^T=(x_k, y_k, r_k, V_{rk})$. Both the locations of the centroids as well as the number of sub-clusters K can be fitting parameters of the segmentation procedure that can be changed during iterative clustering (which amounts to assigning and reassigning points to sub-clusters with increasing accuracy). A measure of how confidently j-th point belongs to k-th sub-cluster can be a Euclidean distance parameter, such as $$D_{jk}=a(x_j-x_k)^2+b(y_j-y_k)^2+c(r_j-r_k)^2+d(V_{ir}-V_{kr})^2$$

with coefficients a, b, c, d determining how much weight is assigned to a distance from the respective centroid along a particular dimension. The numerical values of the coefficients can be selected empirically, based on testing performed on actual point clouds that have been segmented by a developer or by automatic methods of segmentation, including object recognition from images taken by camera (e.g., contemporaneously, using camera that is synchronized with the sensing system). Segmentation into sub-clusters can be performed iteratively. Each iteration can include: 1) assigning various points into sub-clusters based on current location of the sub-clusters' centroids (or based on other known metrics), and 2) re-computing locations of the centroids (or other metrics) based on the current assignment of points to sub-clusters. Such iterations can be performed until the procedure converges to a target accuracy or if further iterations do not change the obtained assignment of points to current sub-clusters.

In some implementations, techniques of adding and pruning points to sub-clusters can be used in K-means clustering. For example, once sub-cluster centroids are identified with sufficient accuracy based on smaller sub-clusters, more points can be added to the identified sub-clusters based on the distances to the identified centroids. Centroids can remain fixed or can be adjusted when new points are added. In some implementations, some points can be omitted (pruned) from sub-clusters; points that are subject to pruning can be outlier points, points located near the current boundary of the sub-clusters, points that preclude the iterative procedure from converging, and so on.

In the above example, K-means clustering algorithm is based on distances in a space of dimensions that represent raw data (coordinates and radial velocity). In other implementations, some of the dimensions can correspond to various processed values, such as the lateral velocity values computed based on the rigid-body equation. For example, at each iteration, for each or some of the current sub-clusters, a best fit computation can identify translational velocity $\vec{V}$ and angular velocity $\vec{\Omega}$ (e.g., using least squares method) based on points already assigned to the sub-cluster(s). Subsequently, based on the identified $\vec{V}$ and $\vec{\Omega}$, one or more lateral velocities can be determined for some or all points in the current sub-cluster(s). The determined lateral components can then be used as additional dimensions in the augmented space of vectors $\hat{X}_j^T=(x_j, y_j, r_j, V_{xj}, V_{yj}, V_{rj})$, with the distances to the sub-cluster centroids determined in the augmented space as described above, with additional distances associated with the dimensions $V_x$ and $V_{x'}$. After reassigning points to sub-clusters based on the computed distances, another iteration can performed, starting with identifying the updated translational velocity $\vec{V}$ and the angular velocity $\vec{\Omega}$, and so on, until the iterative procedure converges. In some implementations, other parameters can be included (e.g., as additional dimensions of the space of vectors) to further facilitate segmentation. For example, intensity of the reflected signal can be used as such an additional dimension, since different parts of the object (e.g., legs, arms, body of a car, car wheels, etc.) are likely to have at least somewhat different reflectivities (caused by different type of clothing, materials, surface paint, etc.).

In some implementations, the number of sub-clusters K can be determined concurrently with the performance of the segmentation operation. More specifically, segmentation can be performed, alternatively, into schemes with K−1, K, K+1 . . . , etc., sub-clusters, with various measures used to determine which segmentation scheme is to be selected, such asan elbow point method, Akaike criterion, cross-validation methods, information criteria, information theoretic jump method, silhouette methods, G-means algorithms, and so on. Although, the K-means clustering is described above, as a way of example, in some implementations, other methods of clustering augmented with velocity information, can be used instead, such as mean-shift clustering, density-based clustering, expectation—maximization clustering, hierarchical clustering, and the like.

A Gaussian Mixture Model (GMM) can be used for segmentation, in some implementations. More specifically, various points in the point cloud $\{P\}$ can be distributed across (hypothesized) sub-clusters $\{P_1\}, \{P_2\}, \ldots \{P_M\}$. For each sub-cluster $\{P_m\}$, a mean vector value $\hat{E}(m)$ of all vectors $\hat{X}$ associated with points belonging to the respective sub-cluster can be determined together with the covariance matrix $\widehat{Cov}(m)$. For each point $\hat{X}$ that is hypothesized to belong to sub-cluster m (or already classified as belonging to this cluster), the Mahalanobis distance can be computed from the respective distribution (sub-cluster), e.g., $D_m(\hat{X})$ $[\hat{X}-\hat{E}(m)]^T \widehat{Cov}(m) [\hat{X}-\hat{E}(m)]$. Subsequently, classification of the point $\hat{X}$ can be performed based on the determined Mahalanobis distances, e.g., by associating the point $\hat{X}$ with the cluster whose Mahalanobis distance to the point $\hat{X}$ is the smallest. Similar to the K-means clustering, GMM clustering can be performed in an iterative manner, with various clusters parameters (means, covariances, etc.) and distances to various points recomputed as more points are added to different sub-clusters or transferred between sub-clusters (following iterative changes to the cluster parameters).

Figure 6:
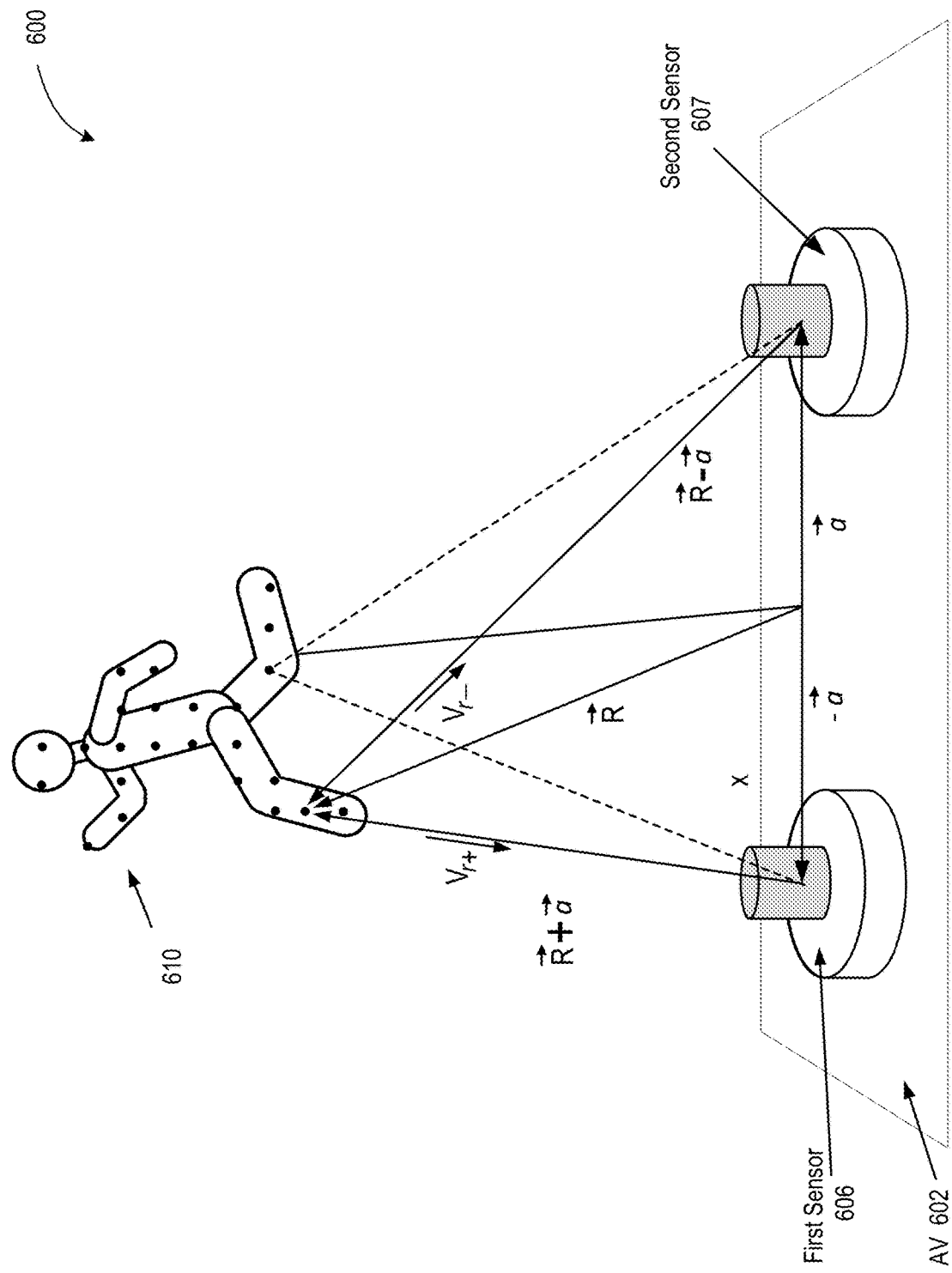
FIG. 6 is an illustration of a double sensor setup for enabling efficient classification of objects in autonomous driving applications, in accordance with some implementations of the present disclosure.

In some implementations, the sensing system 120 can include more than one sensor, e.g., more than one coherent lidar, such as some of lidar sensor(s) 122. In such implementations, multiple sensing frames can be obtained simultaneously (provided that frames of different sensors are synchronized). This can allow the perception system 132 to perform object classification faster and more accurately than in case of a single-sensor system, even before subsequent sensing frames are obtained. FIG. 6 is an illustration of a double sensor setup 600 for enabling efficient classification of objects in autonomous driving applications, in accordance with some implementations of the present disclosure. Depicted in FIG. 6 is AV 602 that has multiple coherent lidar sensors (two are shown for specificity), such as a first sensor 606 and a second sensor 607, which can be any type of a coherent (or a combination of a coherent and incoherent) lidar devices capable of sensing the distance to a reflecting surface and the radial velocity of the reflecting surface of an object in the driving environment. The sensors 606 and 607 can perform scanning of the driving environment and generate return points corresponding to various objects. Each sensor can output signals that have imparted phase signatures (e.g., chirps or any other phase or frequency modulation features) that are unique to the sensor, so that the return signals from different sensors do not interfere with each other. Sensors 606 and 607 can be located at some distance 2a (the baseline distance) from each other for improved lateral velocity resolution. In some implementations, the baseline distance can be made as large as practical (e.g., as limited by the length or width of AV 602). In some implementations, because lateral velocity resolution has a maximum in the direction perpendicular to the baseline and a minimum in the direction parallel to the baseline, more than two sensors can be utilized, e.g., placed in a non-collinear (e.g., triangular) arrangement. For example, a third sensor can be located near the front or back of the AV 602.

In some implementations, a processing logic of the sensing system (e.g., sensing system 120) can synchronize the sensing frames of sensor 606 and sensor 607 so that the sensing signals are output at the same instances of time, e.g., at $\tau, \tau+\Delta\tau, t+2\Delta\tau, \tau+3\Delta\tau$, etc. In other implementations, the sensor frames can be staggered (for example, to reduce possible interference or to improve temporal resolution) so that one sensor outputs signals at times $\tau, \tau+\Delta\tau, \tau+2\Delta\tau, \tau+3\Delta\tau$, whereas the other sensor outputs sensing signals at times $\tau+\Delta\tau/2, \tau+3\Delta\tau/2, \tau+5\Delta\tau/2$, and so on. Each sensor can obtain its respective return points which can be—due to different positioning and timing of the sensing frames—somewhat different from the return points of the other sensor(s) even at the same times. A processing logic of the perception system (e.g., perception system 132) can identify, for each return point $\vec{R}_1$ of the first sensor, the closest return point $\vec{R}_2$ of the second sensor and associate the two points with the same reflecting part of the object 610. In some implementations, the processing logic can approximate that the reflecting part is located at the halfway point, $(\vec{R}_1 + \vec{R}_2)/2$.

An object 610 (a running pedestrian is depicted for specificity) can generate a cluster of return points (shown as black dots within the object 610). Because the first sensor 606 and the second sensor 607 are positioned at different locations, the radial velocities measured by the two sensors (and denoted by $V_{r+}$ and $V_{r-}$) can provide sufficient information about all components of the vector velocity of the respective return point.

The object 610 can be a composite object that is not a rigid body, but in some instances can include various parts that can be approximated as rigi-body parts, such as left (right) lower leg, left (right) upper leg, left (right) forearm, and so on. The motion of some or each of such parts can be described by the rigid-body equation, which can now be projected separately onto the direction of view of the first sensor 606, $\vec{R}+\vec{a}$, and the direction of view of the second sensor 607, $\vec{R}-\vec{a}$. The two respective radial velocities (with the + sign corresponding to the direction from the first sensor 606 and the − sign corresponding to the direction from the second sensor 607) are, $$V_{r\pm} = \vec{V}_O \cdot \frac{\vec{R}_\pm}{R_\pm} + (\vec{R}_{O\pm} \times \vec{\Omega}) \cdot \frac{\vec{R}_\pm}{R_\pm},$$

where $\vec{R}_\pm = \vec{R} \pm \vec{a}$, $R_\pm = |\vec{R} \pm \vec{a}|$, and $\vec{R}_{O\pm} = \vec{R}_0 \pm \vec{a}$, where $\vec{R}_0$ is a reference center of rotation. Because for each point there are two radial velocity equations, three points can potentially determine all six components of the translational and the angular velocities of the respective body part. Since the two radial directions are different from each other, lateral velocity of the body part can be determined based on a single reference frame, in some implementations. If multiple points are available per moving body part, methods of statistical analysis can be used for improving accuracy of segmentation, as described above. In some implementations, based on the determined (e.g., by fitting to the rigid-body equations) lateral velocities of various parts of object 610, the perception system 132 can separate the cluster of points into sub-clusters (associated with respective body parts) that are characterized with translational velocities $\vec{V}_O$ and angular velocities $\vec{\Omega}$ that are different from velocities of other sub-clusters (associated with different parts). Subsequently, the PAC module 137 can identify patterns in the velocities of various sub-clusters and compare the identified patterns with known patterns—e.g., stored in a memory device accessible to PAC module 137—of various objects that can be encountered in driving environments. Based on the results of such comparison, PAC module 137 can classify object 610 as one of such objects.

Figure 7:
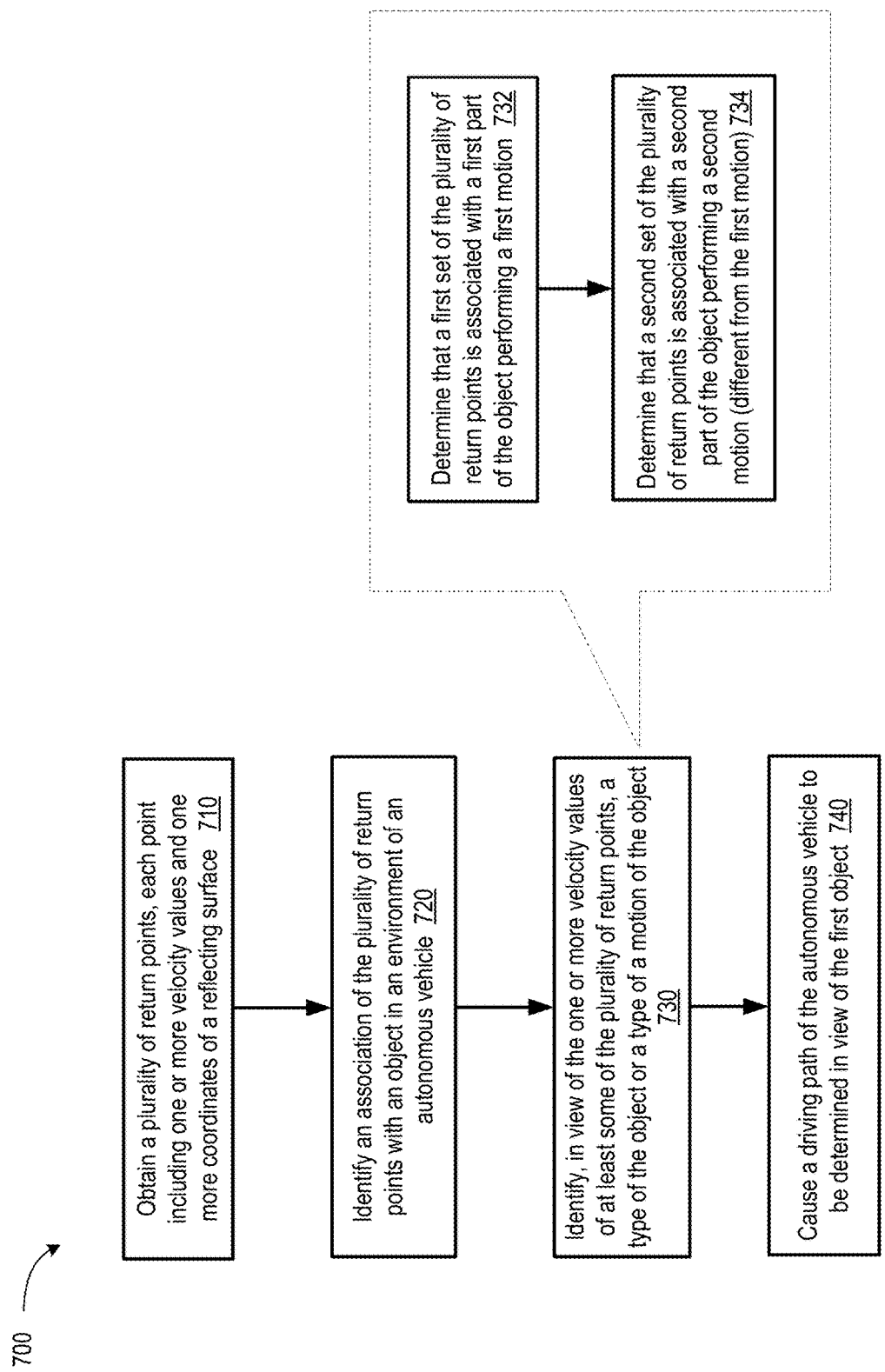
FIG. 7 depicts a flow diagram of an example method of using velocimetry data for motion pattern-assisted object classification, in accordance with some implementations of the present disclosure.

FIG. 7 depicts a flow diagram of an example method 700 of using velocimetry data for motion pattern-assisted object classification, in accordance with some implementations of the present disclosure. Method 700 and/or each of its individual functions, routines, subroutines, or operations can be performed by a processing device, having one or more processing units (CPU) and memory devices communicatively coupled to the CPU(s). The processing device executing method 700 can perform instructions from various components of the perception system 132, e.g., PAS module 133, and/or PAC module 137. In certain implementations, method 700 can be performed by a single processing thread. Alternatively, method 700 can be performed by two or more processing threads, each thread executing one or more individual functions, routines, subroutines, or operations of the method. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. Various operations of method 700 can be performed in a different order compared with the order shown in FIG. 7. Some operations of method 700 can be performed concurrently with other operations. Some operations can be optional.

Method 700 can be directed to systems and components of an autonomous driving vehicle, such as the autonomous vehicle 100 of FIG. 1A. Method 700 can be used to improve performance of the autonomous vehicle data processing system 130 and/or the autonomous vehicle control system 140. At block 710, method 700 can include obtaining, by a sensing system of an autonomous vehicle (AV), a plurality of return points, each return point comprising one or more velocity values and two or more coordinates of a reflecting region that reflects a signal emitted by the sensing system. Obtaining return points can include some or all of the following. One or more sensors (e.g., lidar, FMCW, hybrid ToF/coherent lidar, and so on) of the sensing system of the AV can emit a series of signals (e.g., optical signals). The signals can be emitted in a periodic (cyclic) pattern, e.g. by rotating, pivoting or otherwise scanning transmitters or transmitted beams (e.g., through beam steering, etc.), in various directions, e.g., forming the panoramic pattern. The signals can strike various objects (moving or stationary) and reflect back towards the sensor from various reflecting regions of the objects. The number of reflecting regions can vary depending on the nature, size of the object, the object's level of occlusion by other objects. The intensity of the reflected signals can depend on the kind (material, surface type, etc.) of the reflecting region, the wavelength of the signal, polarization, etc. Based on the characteristics and timing of the reflected signals, the sensing system of the AV can generate a plurality of return points. The return points are data entries that are associated with a reflection of one of the emitted signals from an object of the environment. The return points can be generated in real time. Each return point can include various data entries, such as a timestamp of a cycle of the sensor, intensity of the returned signals, polarization of the returned signals. Each return point can include two or more coordinates of the respective reflecting region. For example, the coordinates can be a distance to the reflecting region (e.g., determined from the time of flight of the returned signals), and one or more directional angles, such as the azimuthal angle specifying direction within the horizontal plane and the polar angle specifying the elevation above (or below) the horizontal plane. Each return point can further include a velocity value; the velocity value can represent the radial component of the velocity of the reflecting region with respect to the radial direction from a transmitter of the sensing system towards the reflecting region.

The sensor can be a coherent light detection and ranging device (lidar) capable of detecting the radial velocity using, e.g., Doppler-assisted sensing. In some implementations, the coherent lidar can be a frequency-modulated continuous-wave lidar and the signals emitted by the sensor can include phase-modulated or frequency-modulated electromagnetic waves. The sensor can also be capable of concurrently emitting various other signals, such as pulsed signals, which can be used for ToF distance measurements. In some embodiments, the sensor can include separate ToF lidar and a coherent lidar, each emitting separate signals that can be synchronized, mixed, and transmitted along the same optical paths. The return points can belong to (e.g., be associated with) various sensing frames corresponding to different cycles (e.g., revolutions) of the transmitter(s) of the sensing system.

At block 720, method 700 can continue with a processing device (e.g., a device executing software instructions issued by PAS module 133/PAC module 137 as part of the perception system 132) identifying an association of the plurality (cluster) of return points with an object in an environment of the AV. For example, segmentation module 182 can use one or more clustering algorithms, such as clustering in real space, clustering in a space that includes additional dimensions, such as one or more velocity values of the reflecting point, intensity (reflectance) of the reflected sensed signal, and so on. In some implementations, segmentation of the cluster of the return points can be performed based on return data from a single sensing frame. In some implementations, segmentation of the cluster of the return points can be performed using return data from two or more sensing frames, e.g., using methods of geometric mapping, such as ICP mapping, and the like. Identifying the association of the cluster of return points with an object can include applying a clustering criterion to a point in the cluster. In one example, the clustering criterion can include (at least in part) computing distances from the return points of the first set to reference points (e.g., centroids) of multiple clusters and determining that the distance from each of the first set of the return points to a reference point of a particular cluster (e.g. "first cluster") is smaller than the distances to centroids of other clusters. The first cluster can be identified as part of a hypothesis that the points in the first cluster correspond to a single object.

In some implementations, method 700 can continue, at block 730, with the processing device identifying, in view of the one or more velocity values of at least some of the plurality of return points, a type of the object and/or a type of a motion of the object. In some implementations, as shown by the blowout section in FIG. 7, identifying the type of the object can include determining that a first set (e.g., a first sub-cluster) of the plurality of return points is associated with a first part of the object, the first object performing a first motion (block 732) and further determining that a second set (e.g., a second sub-cluster) of the plurality of return points is associated with a second part of the object, the second object performing a second motion (block 734). The second motion can be different from the first motion. The terms "first" and "second" should be understood as identifiers only and do not imply a specific order of identification. In particular, there can be an arbitrary number of other identified sub-clusters within the plurality of points.

In some implementations, identifying the type of the object can include fitting the one or more velocity values and the one or more coordinates of at least some of the plurality of return points to a rigid-body equation characterizing a motion of a rigid body. More specifically, identifying that the first set of the return points is associated with the first part of the object can include fitting the one or more velocity values and the one or more coordinates of each of the first sub-cluster of the return points to a rigid-body equation characterizing a motion of a rigid body. A rigid body can be a body in which a distance between any two points is (approximately, within a target accuracy) fixed. As a result, the motion of such a body can be described with six parameters (or fewer than six parameters, in cases of a geometrically restricted motion, such as a two-dimensional motion). The six parameters can be (1) the three components of the object's translational velocity $\vec{V}$, and (2) the three components of the object's rotational (angular) velocity $\vec{\Omega}$. In some implementations, additional parameters can include coordinates of a center of rotation with respect to which the translational velocity is specified.

Fitting the one or more velocity values (e.g., a first radial velocity measured by a first sensor and/or a second radial velocity measured by a second sensor) and the one or more coordinates of each return point of the first sub-cluster can include predicting the radial velocity value(s) based on the coordinates of the return points and the fitting parameters (e.g., $\vec{V}$ and $\vec{\Omega}$) using the rigid-body equation and comparing predicted values to the measured radial velocity values (e.g., $V_r$ if one sensor is being used, or $V_{r+}$ and/or $V_{r-}$, if two sensors are being used, and so on). A fitting error can then be determined for the first sub-cluster. For example, the fitting error can be a mean squared error, a median squared error, a maximum squared error, or any other function (e.g., a statistical measure) characterizing the error between the predicted velocities and the measured velocities. If the computed fitting error is greater than a target error, a hypothesis that the first sub-cluster corresponds to a rigid-body part of the object can be invalidated. If the computed fitting error is smaller than the target error, the hypothesis can be accepted (in some implementations, subject to further verification, e.g., using additional sensing frames). A similar type of determination can also be performed for the second sub-cluster, third sub-cluster, and so on.

Based on the identified motion of the part of the object associated with the first sub-cluster (and, optionally, based on the identified motion of the second part of the object associated with the first sub-cluster), the processing device can identify that the object is of "pedestrian" type, e.g., a walking, running, skip-walking pedestrian, or a pedestrian moving in some other manner. For example, the processing device can detect the pattern of velocities associated with a swinging leg of the pedestrian or a thrusting leg of the pedestrian (and, optionally, a pattern of velocities associated with the other—e.g., supporting, inactive, etc., leg). Additionally, or instead, the processing device can detect the pattern of velocities associated with one or more arms of the pedestrian. In some instances, the determined first motion and the second motion can occur in opposite directions. For example, the first motion of the first part—an arm of the pedestrian—can be a rotational motion that occurs in the opposite direction compared with the second motion of the second part—e.g., the other arm of the pedestrian. In another example, the first part can be a leg of the running pedestrian swinging forward and the second part can be the other leg propelling the running pedestrian forward and, subsequently, swinging backward. The term "opposite" should be understood to indicate that the first motion and the second motion can occur in opposite directions—either translationally or rotationally—in a reference frame of the pedestrian. (Although in a reference frame of the ground, both the first part and the second part can be moving in substantially the same direction, if the forward velocity of the pedestrian relative to the ground is larger than the velocity of the backward-swinging leg or arm in the reference frame of the pedestrian.)

In some implementations, the object can be of a "vehicle" type. The second part of the object can be a wheel of the vehicle while the first part of the object can include at least a part of a body of the vehicle (e.g., a part of the body adjacent to the wheel). The first motion can be a translational motion (e.g., the vehicle moving forward) and the second motion can be a combination of the translational motion and a rotational motion (e.g., the wheel moving forward while rotating around the axle). Identification of the object type (e.g., a wheeled vehicle) can include determining pattern of velocities around the circumference of the wheel. In some instances, the wheel can perform a normal rotation (without slipping). In such instances, the pattern of velocities can include points near the bottom of the wheel that have small velocity (zero, where the wheels meets the ground) and/or points near the top of the wheel that have velocity that is double (or close to double) of the translational velocity of the vehicle. In some instances, the pattern of velocities can indicate that the vehicle is slipping. For example, the points near the bottom of the wheel that have non-zero velocity (in the forward or backward direction), and/or points near the top of the wheel that have velocity different (larger or smaller) from double the translational velocity of the vehicle.

In some implementations, the object being a vehicle, the second part of the object can be a door of the vehicle while the first part of the object can include at least a part of a body of the vehicle (e.g., a part of the body adjacent to the wheel). For example, the first motion can be a translational motion relative to the AV (e.g., a stopped car being observed from a moving AV), and the second motion include a rotational motion around a vertical axis (e.g., a rotation of the car door).

At block 740, method 700 can continue with the processing device causing a driving path of the AV to be determined in view of the identified type of the object. For example, the perception system can identify an object as a pedestrian that is crossing the road and communicate this information to the control system (e.g., the AVCS 140). The control system can then determine that the AV is about to reach the pedestrian before the pedestrian can cross the road. The control system can determine a new path for the AV, which can include braking, changing lanes, stopping, and so on. The control system can subsequently output instructions to powertrain and steering 150, vehicle electronics 160, signaling 170, etc., to ensure that the AV follows the determined driving path.

Figure 8:
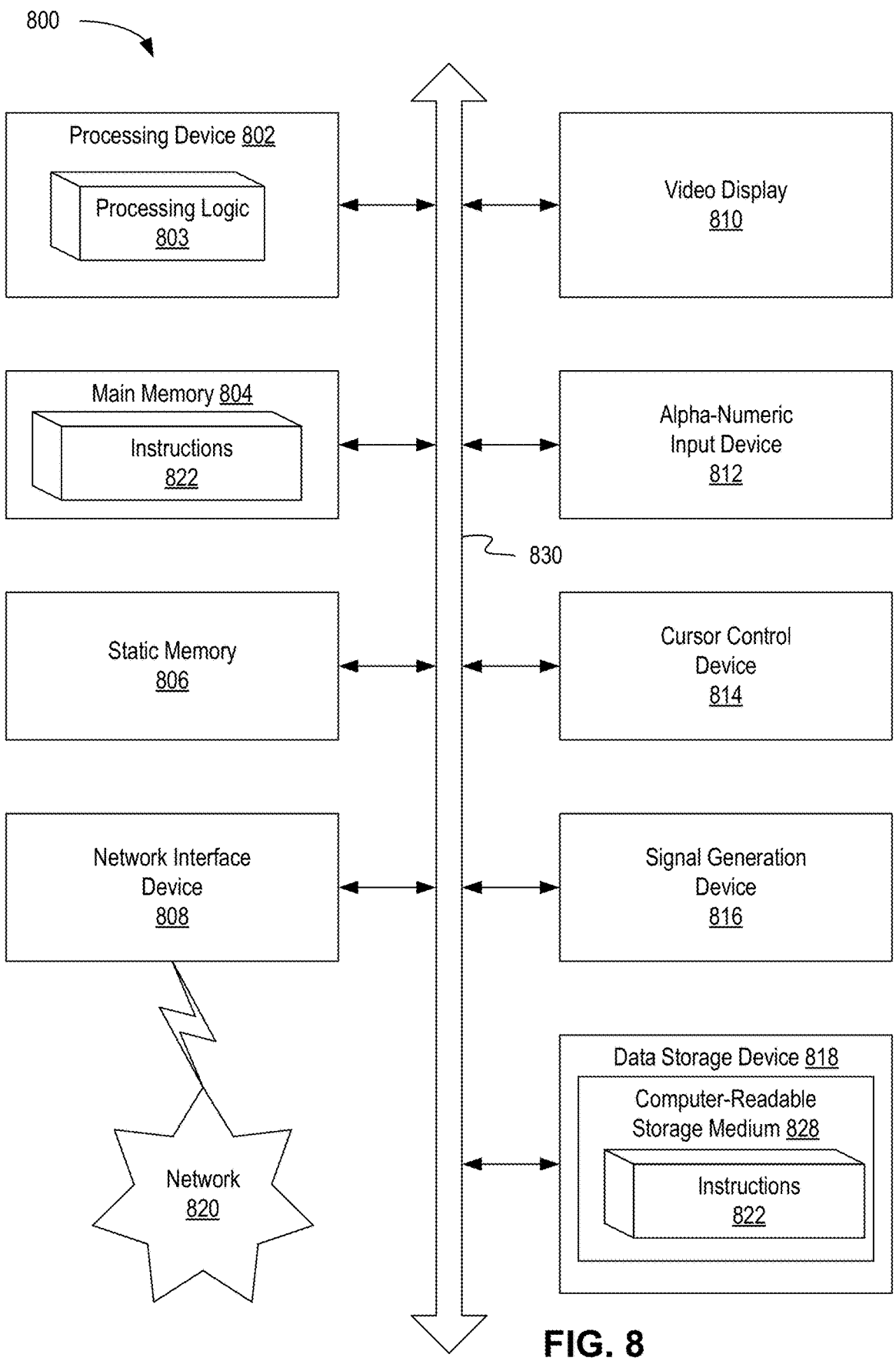
FIG. 8 depicts a block diagram of an example computer device capable of enabling Doppler-assisted segmentation of a point cloud for autonomous driving vehicle applications, in accordance with some implementations of the present disclosure.

FIG. 8 depicts a block diagram of an example computer device 800 capable of enabling Doppler-assisted segmentation of a point cloud for autonomous driving vehicle applications, in accordance with some implementations of the present disclosure. Example computer device 800 can be connected to other computer devices in a LAN, an intranet, an extranet, and/or the Internet. Computer device 800 can operate in the capacity of a server in a client-server network environment. Computer device 1000 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 700 of using velocimetry data for motion pattern-assisted object classification.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 700 of using velocimetry data for motion pattern-assisted object classification.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   obtaining, by a sensing system of an autonomous vehicle (AV), a plurality of return points, each return point comprising one or more velocity values and one or more coordinates of a reflecting region that reflects a signal emitted by the sensing system;
   identifying an association of the plurality of return points with an object in an environment of the AV;
   segmenting, based on a first value of a translational velocity and a second value of a rotational velocity, the plurality of return points into at least a first cluster of points and a second cluster of points, wherein the first cluster of points is segmented by fitting the first cluster of points using a translational rigid-body motion associated with the first value of the translational velocity, and wherein the second cluster of points is segmented by fitting the second cluster of points using a combination of:
      the translational rigid-body motion associated with the first value of the translational velocity, and
      a rotational rigid-body motion associated with the second value of the rotational velocity;
   identifying, using the first cluster of points and the second cluster of points, a type of the object; and
   outputting a control instruction that causes one or more AV control systems to change a driving path of the AV in view of the identified type of the object.

2. The method of claim 1, further comprising:
   identifying, using at least the first value of the translational velocity, a trajectory of the object.

3. The method of claim 1, wherein the object comprises a pedestrian.

4. The method of claim 3, wherein the translational rigid-body motion is associated with a torso of the pedestrian and the rotational rigid-body motion is associated with at least one of an arm of the pedestrian or a leg of the pedestrian.

5. The method of claim 1, wherein the object comprises a vehicle, wherein the first cluster of points is associated with at least a portion of a body of the vehicle, and wherein the second cluster of points is associated with a wheel of the vehicle.

6. The method of claim 5, further comprising:
   determining, based on a mismatch of the first value of the translational velocity with the second value of the rotational velocity, that the wheel of the vehicle is slipping.

7. The method of claim 1, wherein segmenting the plurality of return points comprises;
   computing, with an individual point of the plurality of return points, a distance in a coordinate-velocity space from the individual point to a centroid of the first cluster of points; and
   determining association of the individual point with the first cluster of points using the computed distance in the coordinate-velocity space.

8. The method of claim 1, wherein the object comprises a vehicle, the first cluster of points is associated with at least a portion of a body of the vehicle, and wherein the second cluster of points is associated with a door of the vehicle.

9. The method of claim 8, wherein the rotational rigid-body motion is associated with a rotational motion of the door of the vehicle around a vertical axis.

10. The method of claim 1, wherein the sensing system of the AV comprises a coherent light detection and ranging device (lidar) and wherein the signal emitted by the sensing system comprises a phase-modulated or a frequency-modulated electromagnetic wave.

11. The method of claim 10, wherein the coherent lidar is a frequency-modulated continuous-wave lidar.

12. The method of claim 1, wherein the one or more velocity values comprise a component of a velocity of the reflecting region along a direction from a transmitter of the sensing system to the reflecting region.

13. The method of claim 1, wherein the one or more velocity values comprise a first velocity value obtained using a first sensor of the sensing system and a second velocity value obtained using a second sensor of the sensing system, wherein the second sensor is located differently from the first sensor.

14. A system comprising:
   a sensing system of an autonomous vehicle (AV), the sensing system to:
      obtain a plurality of return points, each return point comprising one or more velocity values and one or more coordinates of a reflecting region that reflects a signal emitted by the sensing system; and
   a perception system of the AV, the perception system to:
      identify an association of the plurality of return points with an object in an environment of the AV;
      segment, based on a first value of a translational velocity and a second value of a rotational velocity, the plurality of return points into at least a first cluster of points and a second cluster of points, wherein the first cluster of points is segmented by fitting the first cluster of points using a translational rigid-body motion associated with the first value of the translational velocity, and wherein the second cluster of points is segmented by fitting the second cluster of points using a combination of:
         the translational rigid-body motion associated with the first value of the translational velocity, and
         a rotational rigid-body motion associated with the second value of the rotational velocity;

identify, using the first cluster of points and the second cluster of points, a type of the object; and output a control instruction that causes one or more AV control systems to change a driving path of the AV in view of the identified type of the object.

15. The system of claim 14, wherein the perception system is further to:

identify, using at least the first value of the translational velocity, a trajectory of the object.

16. The system of claim 14, wherein the object comprises a pedestrian.

17. The system of claim 14, wherein the translational rigid-body motion is associated with at least one of:
   a torso of a pedestrian, or
   a body of a vehicle; and
wherein and the rotational rigid-body motion is associated with at least one of:
   an arm of the pedestrian,
   a leg of the pedestrian, or
   a wheel of the vehicle.

18. The system of claim 14, wherein plurality of return points are obtained using a coherent light detection and ranging device (lidar) of the sensing system and wherein the signal emitted by the sensing system comprises a phase-modulated or a frequency-modulated electromagnetic wave.

19. A non-transitory computer-readable medium having instructions stored thereon that, when executed by a computing device, cause the computing device to:

obtain, from a sensing system of an autonomous vehicle (AV), a plurality of return points, each return point comprising one or more velocity values and one or more coordinates of a reflecting region that reflects a signal emitted by the sensing system;

identify an association of the plurality of return points with an object in an environment of the AV;

segment, based on a first value of a translational velocity and a second value of a rotational velocity, the plurality of return points into at least a first cluster of points and a second cluster of points, wherein the first cluster of points is segmented by fitting the first cluster of points using a translational rigid-body motion associated with the first value of the translational velocity, and wherein the second cluster of points is segmented by fitting the second cluster of points using a combination of:
   the translational rigid-body motion associated with the first value of the translational velocity, and
   a rotational rigid-body motion associated with the second value of the rotational velocity:

identify, using the first cluster of points and the second cluster of points, a type of the object; and output a control instruction that causes one or more AV control systems to change a driving path of the AV in view of the identified type of the object.

* * * * *